United States Patent
Saika

(10) Patent No.: US 8,166,548 B2
(45) Date of Patent: Apr. 24, 2012

(54) COMPUTER SYSTEM AND METHOD FOR SCANNING COMPUTER VIRUS

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 902 days.

(21) Appl. No.: 11/970,783

(22) Filed: Jan. 8, 2008

(65) Prior Publication Data
US 2009/0070879 A1    Mar. 12, 2009

(30) Foreign Application Priority Data

Sep. 6, 2007  (JP) ................................. 2007-231295

(51) Int. Cl.
*H04L 29/06* (2006.01)
(52) U.S. Cl. ................ 726/24; 726/22; 726/23; 726/26; 713/188; 710/46; 710/52
(58) Field of Classification Search .......... 726/4, 22–24, 726/26; 710/43–57
See application file for complete search history.

(56) References Cited

U.S. PATENT DOCUMENTS

| | | | | |
|---|---|---|---|---|
| 6,023,720 A * | 2/2000 | Aref et al. | ...................... | 718/103 |
| 6,748,534 B1 * | 6/2004 | Gryaznov et al. | ............. | 713/188 |
| 7,730,238 B1 * | 6/2010 | Arulambalam et al. | ........ | 710/52 |
| 2002/0124181 A1 * | 9/2002 | Nambu | .......................... | 713/200 |
| 2003/0009690 A1 * | 1/2003 | Grupe | ........................... | 713/201 |
| 2004/0117401 A1 | 6/2004 | Miyata et al. | | |
| 2007/0038681 A1 * | 2/2007 | Pierce et al. | .................. | 707/201 |
| 2007/0083929 A1 * | 4/2007 | Sprosts et al. | ................... | 726/22 |

FOREIGN PATENT DOCUMENTS

JP    2004-199213    7/2004

OTHER PUBLICATIONS

P Royal, M Halpin, D Dagon,PolyUnpack: Automating the Hidden-Code Extraction of Unpack-Executing Malware , Dec. 2006, ACSAC, pp. 289-300.*

* cited by examiner

*Primary Examiner* — Taghi Arani
*Assistant Examiner* — Amir Mehrmanesh
(74) *Attorney, Agent, or Firm* — Brundidge & Stanger, P.C.

(57) ABSTRACT

According to the present invention, a timeout caused by executing a virus scan is avoided. A computer system has a first computer, a second computer coupled to the first computer, and a storage system coupled to the first computer and the second computer. The first computer receives a request to write data, writes the requested data in the storage system, and sends a virus scan request of the written data to the second computer. The second computer receives the virus scan request from the first computer, reads the written data out of the storage system, and partially executes a virus scan of the read data. After the partial virus scan of the read data is finished, the first computer sends a response to the received write request. After the first computer sends the response, the second computer executes the remainder of the virus scan of the read data.

18 Claims, 15 Drawing Sheets

SCAN PROGRESS MANAGEMENT TABLE 300

| # 301 | FILE NAME 302 | COMPLETION/ INCOMPLETION LABEL 303 | WRITE SCAN INFORMATION 304 | | READ SCAN INFORMATION 308 | | RESUMPTION POINT 312 |
| | | | FINISHED DATE/TIME 305 | DEGREE OF PROGRESS 306 | APPLIED VERSION 307 | FINISHED DATE/TIME 309 | DEGREE OF PROGRESS 310 | APPLIED VERSION 311 | |
|---|---|---|---|---|---|---|---|---|---|
| 1 | /dir-a/aaa.txt | INCOMPLETE | 2007/7/7 12:15:00 | #075 | 2 | — | — | — | #076 |
| 2 | /dir-b/bbb.txt | COMPLETE | 2007/7/8 11:20:00 | #075 | 2 | 2007/7/8 11:25:00 | #150 | 2 | — |
| .. | .. | .. | .. | .. | .. | .. | .. | .. | .. |

*FIG. 3*

ACCESS LOG 400

| DATE/TIME 401 | ACCESS SOURCE 402 | ACCESSED FILE 403 | ACCESS TYPE 404 |
|---|---|---|---|
| 2007/7/7 12:00:00 | Client-01 | /dir-a/aaa.txt | read |
| 2007/7/7 12:10:15 | Client-02 | /dir-b/bbb.txt | write ( NEW REGISTRATION ) |
| 2007/7/7 12:15:47 | Client-03 | /dir-c/ccc.txt | write ( EXISTING FILE UPDATE ) |
| .. | .. | .. | .. |

*FIG. 4*

NOTIFIED INFORMATION

| DATE/TIME | READ | WRITE | TRANSMISSION DATE/TIME |
|---|---|---|---|
| 2007/7/7 10:00~11:00 | 30% | 70% | 2007/7/7 11:30:00 |
| 2007/7/7 11:00~12:00 | 70% | 30% | 2007/7/7 12:30:00 |
| 2007/7/7 12:00~13:00 | 10% | 90% | 2007/7/7 13:30:00 |
| : | : | : | : |

*FIG. 5*

SCAN PROGRESS MANAGEMENT TABLE

| # | FILE NAME | COMPLETION/ INCOMPLETION LABEL | WRITE SCAN INFORMATION | | | READ SCAN INFORMATION | | | RESUMPTION POINT |
|---|---|---|---|---|---|---|---|---|---|
| | | | FINISHED DATE/TIME | DEGREE OF PROGRESS | APPLIED VERSION | FINISHED DATE/TIME | DEGREE OF PROGRESS | APPLIED VERSION | |
| 1 | /dir-a/aaa.txt | INCOMPLETE | 2007/7/7 12:15:00 | #075 409/512 | 2 | — | — | — | #075 410/512 |
| 2 | /dir-b/bbb.txt | COMPLETE | 2007/7/8 11:20:00 | #075 512/1024 | 2 | 2007/7/8 11:25:00 | #100 1024/1024 | 2 | — |
| .. | .. | .. | .. | .. | .. | .. | .. | .. | .. |

COMPUTER SYSTEM AND METHOD FOR SCANNING COMPUTER VIRUS

CLAIM OF PRIORITY

The present application claims priority from Japanese application JP2007-231295 filed on Sep. 6, 2007, the content of which is hereby incorporated by reference into this application.

BACKGROUND

A technology disclosed herein relates to a method for managing a storage device, and more particularly, to a method for scanning computer virus in NAS.

NAS stands for network attached storage device, which is a storage device coupled to a network and used as shared disks by a plurality of client computers that are coupled to the network. NAS is composed of a NAS server which contains a network interface and other components, and a disk device which stores data.

As a way to avoid damage to NAS from a computer virus infection, a virus scan technology that uses a scan server has been disclosed (see JP 2004-199213 A). A scan server is a computer coupled to the network to execute a virus scan. Specifically, when the NAS server receives a file operation request from a client computer, the NAS server transfers the operation target file to the scan server. "File operation" refers to writing a file or reading a file. "Operation target file" refers to a file to be written in the disk device or a file read out of the disk device.

The scan server executes a virus scan on the transferred file, and sends the result of the scan to the NAS server in response. In the case where the transferred file is found to be infected with a virus, the scan server repairs the file and transfers the repaired file (i.e., the file free from the virus) to the NAS server. The NAS server executes the requested file operation according to a response from the scan server. Damage from a virus infection is thus avoided by performing a virus check and repairs on files handled by the NAS server.

SUMMARY

As described above, the transfer and virus scan of an operation target file are executed in a time period between the reception of a file operation request at the NAS server and the transmission of the result of the requested file operation to the client computer. When the operation target file is large in size, the transfer and the virus scan could take long enough to cause the session between the client computer and the NAS server to time out. The timeout can be prevented by skipping a virus scan on at least a part of the large-sized file, but partial scan can miss a virus and spread the virus infection.

According to a representative invention disclosed in this application, there is provided a computer system comprising: a first computer; a second computer coupled to the first computer via a network; and a storage system coupled to the first computer and the second computer, wherein the first computer comprises a first interface coupled to the network, a first processor coupled to the first interface, and a first memory coupled to the first processor; wherein the second computer comprises a second interface coupled to the network, a second processor coupled to the second interface, and a second memory coupled to the second processor; wherein the storage system comprises a storage medium for providing a data storage area, and a controller coupled to the first computer and the second computer, for controlling data write and data read in the storage area; wherein the first computer is configured to: write, upon reception of a request to write data via the network, the requested data in the storage system; and send a virus scan request of the written data to the second computer; wherein the second computer is configured to: read, upon reception of the virus scan request from the first computer, the written data out of the storage system; and partially execute a virus scan of the read data; wherein the first computer is further configured to send, after the partial virus scan of the read data is finished, a response to the received write request; and wherein the second computer is further configured to execute, after the first computer sends the response, remainder of the virus scan of the read data.

According to an embodiment of this invention, the response speed can be improved to prevent a timeout while avoiding damage from a virus infection.

BRIEF DESCRIPTION OF THE DRAWINGS

FIG. 3 is an explanatory diagram of a scan progress management table according to the embodiment of this invention.

FIG. 4 is an explanatory diagram of an access log according to the embodiment of this invention.

FIG. 5 is an explanatory diagram of notified information according to the embodiment of this invention.

FIG. 17 is an explanatory diagram of the scan progress management table according to a modification example of the embodiment of this invention.

DETAILED DESCRIPTION OF THE PREFERRED EMBODIMENTS

An embodiment of this invention will be described below with reference to the accompanying drawings.

Figure 1:
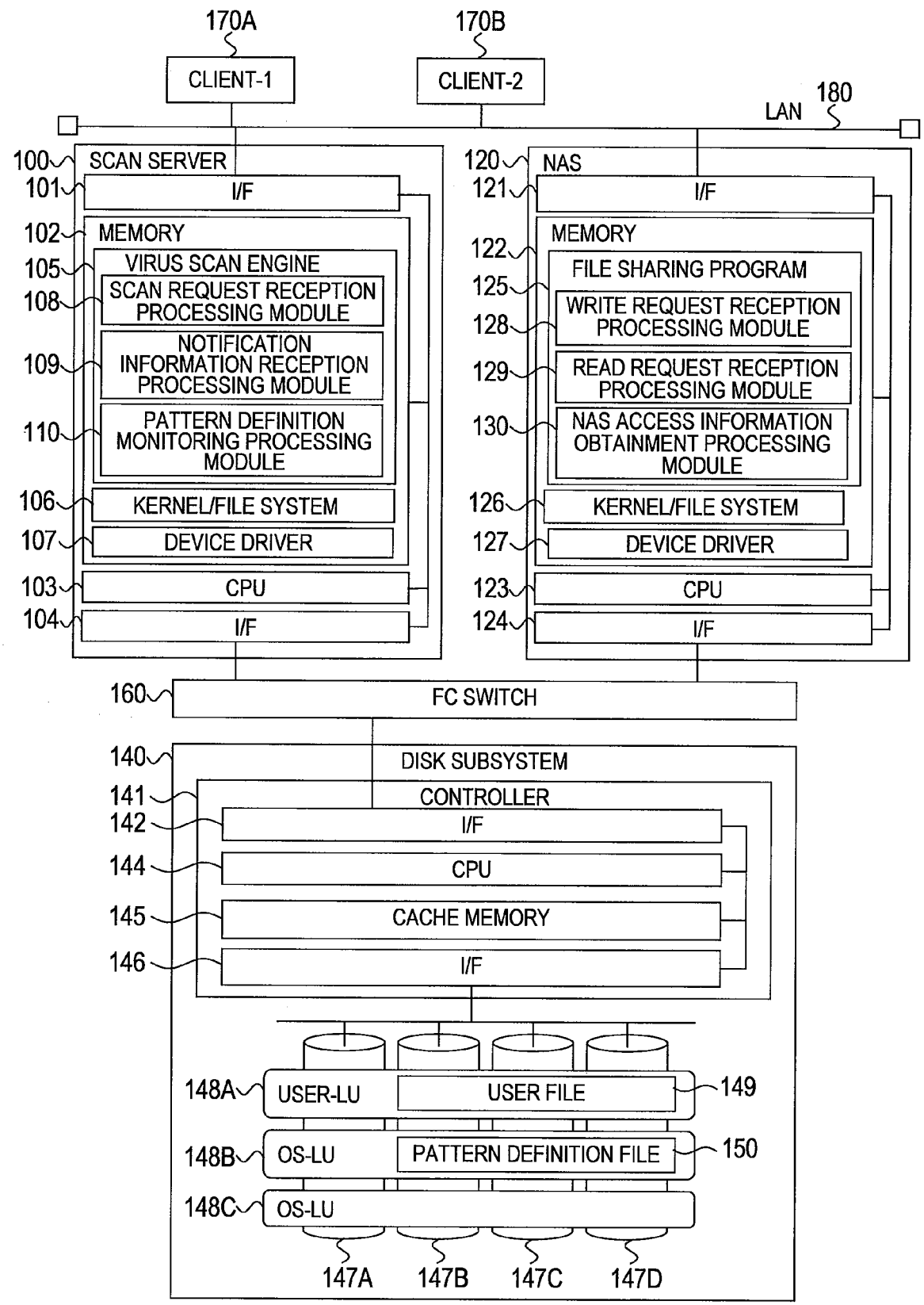
FIG. 1 is a block diagram showing a configuration of a computer system according to an embodiment of this invention.

FIG. 1 is a block diagram showing a configuration of a computer system according to the embodiment of this invention.

The computer system of this embodiment has a plurality of clients 170, a scan server 100, a network attached storage (NAS) server 120, and a disk subsystem 140. The plurality of clients 170, the scan server 100, and the NAS server 120 are coupled to one another via a local area network (LAN) 180. The scan server 100, the NAS server 120, and the disk subsystem 140 are coupled to one another via a fibre channel (FC) switch 160.

The scan server 100 is a computer that executes a virus scan on a file. In the following description, a virus scan may simply be referred to as scan.

The scan server 100 has an I/F 101, a CPU 103, an I/F 104, and a memory 102, which are interconnected.

The I/F 101 is an interface that couples the scan server 100 to the LAN 180. Through the I/F 101, the scan server 100 communicates with a device coupled to the LAN 180 (e.g., with the client computers 170 or the NAS server 120). The I/F 101 is, for example, a network interface card (NIC).

The CPU 103 is a processor that executes a program stored in the memory 102. Therefore, processing that is executed by a program stored in the memory 102 (e.g., a virus scan engine 105, which will be described later) in the following description is actually executed by the CPU 103.

The I/F 104 is an interface that couples the scan server 100 to the FC switch 160. The scan server 100 communicates with the disk subsystem 140 through the I/F 104. The I/F 104 is, for example, a host bus adapter (HBA).

The memory 102 is a semiconductor memory, for example, and stores a program executed by the CPU 103, data referred to by the CPU 103, and the like. The memory 102 in this embodiment stores, as programs executed by the CPU 103, the virus scan engine 105, a kernel/file system 106, and a device driver 107, at least. The kernel/file system 106 and the device driver 107 are provided as a part of an operating system (OS) (omitted from the drawing) executed on the scan server 100.

The virus scan engine 105 is a program that checks a file to be scanned against a pattern definition file, which defines virus patterns as will be described later, to thereby judge whether or not the file is infected with a virus.

The virus scan engine 105 in this embodiment contains a scan request reception processing module 108, a notification information reception processing module 109, and a pattern definition monitoring processing module 110. Those processing modules are program modules included in the virus scan engine 105.

The kernel/file system 106 contains software that has the basic functions of an OS (i.e., the kernel) and software that manages data stored in the disk subsystem 140 (i.e., the file system). The file system provides hierarchized logical views (directories, files, and the like) to an upper layer, and converts the logical views into a physical data configuration (block data, block address) to execute I/O processing in a lower layer.

The device driver 107 executes block I/O requested by the kernel/file system 106.

The NAS server 120 is a computer that couples the disk subsystem 140 to the LAN 180. The NAS server 120 is denoted simply as "NAS 120" in FIG. 1.

The NAS server 120 has an I/F 121, a CPU 123, an I/F 124, and a memory 122, which are interconnected.

The I/F 121 is an interface that couples the NAS server 120 to the LAN 180. Through the I/F 121, the NAS server 120 communicates with a device coupled to the LAN 180 (e.g., with the clients 170 or the scan server 100). The I/F 121 is, for example, an NIC.

The CPU 123 is a processor that executes a program stored in the memory 122. Therefore, processing that is executed by a program stored in the memory 122 (e.g., a file sharing program 125, which will be described later) in the following description is actually executed by the CPU 123.

The I/F 124 is an interface that couples the NAS server 120 to the FC switch 160. The NAS server 120 communicates with the disk subsystem 140 through the I/F 124. The I/F 124 is, for example, an HBA.

The memory 122 is a semiconductor memory, for example, and stores a program executed by the CPU 123, data referred to by the CPU 123, and the like. The memory 122 in this embodiment stores, as programs executed by the CPU 123, the file sharing program 125, a kernel/file system 126, and a device driver 127, at least. The kernel/file system 126 and the device driver 127 are provided as a part of an operating system (OS) (omitted from the drawing) executed on the NAS server 120. The kernel/file system 126 and the device driver 127 are the same as the kernel/file system 106 and the device driver 107, and their descriptions will be omitted.

The file sharing program 125 provides a function of enabling the clients 170 to share a file by providing a file sharing protocol to the clients 170 which are coupled to the LAN 180. The file sharing protocol provided by the file sharing program 125 is, for example, the network file system (NFS) or the common internet file system (CIFS). The file sharing program 125 receives a file-basis I/O (read or write) request from the clients 170, and executes the requested file-basis I/O in a file system, which will be described later.

The file sharing program 125 in this embodiment has a write request reception processing module 128, a read request reception processing module 129, and a NAS access information obtainment processing module 130. Those processing modules are program modules included in the file sharing program 125.

The disk subsystem 140 is a storage device that stores data written by the NAS server 120 in accordance with a write request received from the clients 170. The disk subsystem 140 in this embodiment has a controller 141 and one or more disk drives 147.

The disk drive 147 is a device equipped with a storage medium which provides a data storage area. The disk drive 147 is, for example, a hard disk drive (HDD) having a magnetic disk as the storage medium. Semiconductor storage device (e.g., flash memory), which has a semiconductor memory as the storage medium, or other devices may be employed instead of HDDs. The disk subsystem 140 can have a plurality of disk drives 147. Disk drives 147A to 147D shown in FIG. 1 are each one of the plurality of disk drives 147.

The plurality of disk drives 147 may constitute redundant arrays of inexpensive disks (RAID). Data written by the clients 170 is stored ultimately in physical storage areas provided by the disk drives 147.

A logical volume (LU) 148 is an area treated by the NAS server 120 as a logical disk drive. The logical storage area of the LU 148 is associated with a physical storage area provided by the disk drive 147. The logical storage area of one LU 148 may be associated with the physical storage area of one disk drive 147, or may be associated with the physical storage areas of a plurality of disk drives 147.

The disk subsystem 140 in this embodiment contains a plurality of LUs 148. LU 148A to LU 148C shown in FIG. 1 are each one of the plurality of LUs 148.

In the example of FIG. 1, the LU 148A is a user LU which stores a user file 149. The user file 149 is a file created by a not-shown application program of the clients 170. Actually, data constituting the user file 149 is stored in a plurality of blocks contained in the LU 148A. A block is a storage area of fixed length.

The correspondence between the identifier (file name) of one user file 149 and the address of a block that stores data constituting that particular user file 149 is managed by the kernel/file system 126. The scan server 100, which has the kernel/file system 106 similar to the kernel/file system 126, can also access the user file 149 based on its file name.

FIG. 1 shows only one user file 149, but the LU 148A actually stores an arbitrary count of user files 149.

The LU 148B and the LU 148C are OS-LUs where OSs are stored. The LU 148B stores the OS executed on the scan server 100 and the LU 148C stores the OS executed on the NAS server 120.

Specifically, the LU 148B stores the virus scan engine 105, the kernel/file system 106, and the device driver 107, though not shown in FIG. 1. The scan server 100 is booted up with the use of the LU 148B. After the scan server 100 is booted up, the virus scan engine 105 and other programs in the LU 148B may be copied to the memory 102 as the need arises. The LU 148B also stores a pattern definition file 150, which will be described later with reference to FIG. 2. The pattern definition file 150 may be copied to the memory 102.

The LU 148C stores the file sharing program 125, the kernel/file system 126, and the device driver 127, though not shown in FIG. 1. The NAS server 120 is booted up with the use of the LU 148C. After the NAS server 120 is booted up, the file sharing program 125 and other programs in the LU 148C may be copied to the memory 122 as the need arises.

The controller 141 is a control device that controls the disk subsystem 140. The controller 141 in this embodiment has an I/F 142, a CPU 144, an I/F 146, and a cache memory 145, which are interconnected.

The I/F 142 is an interface that couples the controller 141 to the FC switch 160. Through the I/F 142, the controller 141 communicates with the NAS server 120 and other devices coupled to the FC switch 160.

The CPU 144 is a processor that executes a program for controlling the disk subsystem 140.

The I/F 146 is an interface that couples the controller 141 to the disk drives 147. Through the I/F 146, the controller 141 executes data write and data read in the disk drives 147.

The cache memory 145 is a semiconductor memory that temporarily stores data to be written in the disk drives 147 and data read out of the disk drives 147.

The FC switch 160 mediates FC protocol communication between the NAS server 120, the scan server 100, and the disk subsystem 140. Specifically, the FC switch 160 is coupled to the I/F 104, the I/F 124, and the I/F 142 to set a communication path between any two of those I/Fs.

The FC switch 160 may be replaced by other types of network. For example, the FC switch 160 may be replaced by LAN 180.

The clients 170 are computers that execute various application programs. The computer system of this embodiment may have an arbitrary count of clients 170. Clients 170A and 170B shown in FIG. 1 are each one of the plurality of clients 170.

Each client 170 has a not-shown CPU which executes application programs, a not-shown I/F which is coupled to the LAN 180, and a not-shown memory which stores at least application programs.

The LAN 180 may be replaced by any type of network. For example, the LAN 180 may be replaced by a wide area network (WAN), or by a network that is a combination of a LAN and a WAN.

Figure 2:
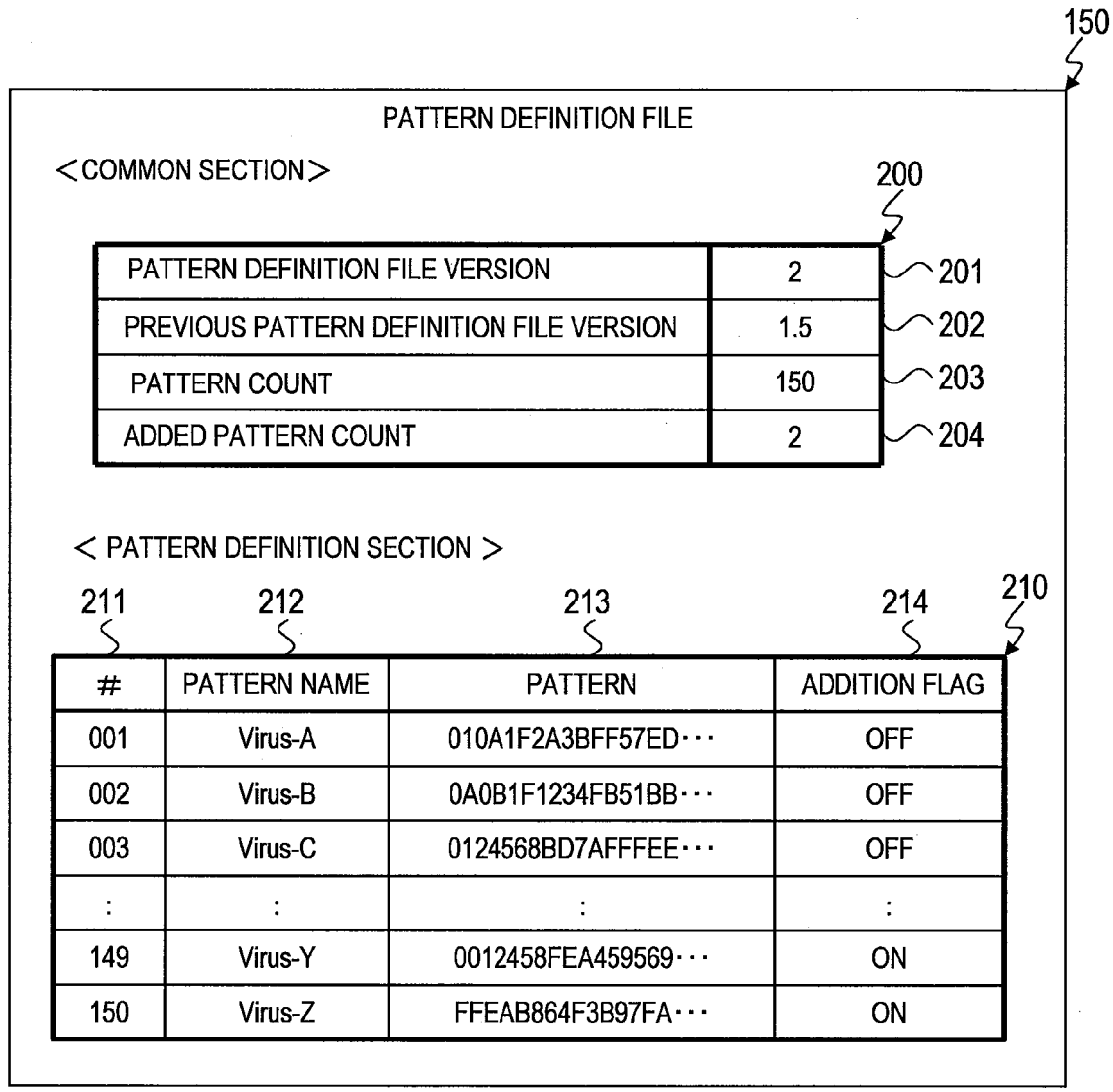
FIG. 2 is an explanatory diagram of a pattern definition file according to the embodiment of this invention.

FIG. 2 is an explanatory diagram of the pattern definition file 150 according to the embodiment of this invention.

The pattern definition file 150 is a file that contains a data pattern representing the characteristics of a virus and information for managing the data pattern. The pattern definition file 150 in this embodiment contains a common section 200 and a pattern definition section 210.

The common section 200 contains a pattern definition file version 201, a previous pattern definition file version 202, a pattern count 203, and an added pattern count 204.

The pattern definition file version 201 indicates the version of the current pattern definition file 150, in other words, the version of a pattern definition that is currently stored in the pattern definition section 210. A larger value stored as the pattern definition file version 201 indicates a newer version.

The previous pattern definition file version 202 indicates a version immediately preceding the version of the current pattern definition file 150. Specifically, when the pattern definition file 150 is updated, the version prior to the update ("1.5" in the example of FIG. 2) is stored as the previous pattern definition file version 202 and the version after the update ("2" in the example of FIG. 2) is stored as the pattern definition file version 201.

The pattern count 203 indicates how many patterns are defined in the pattern definition file 150.

The added pattern count 204 indicates how many patterns are newly added when the pattern definition file 150 is updated to the current version.

In the example of FIG. 2, "150" and "2" are stored as the pattern count 203 and the added pattern count 204, respectively. This means that the count of patterns defined in the pattern definition file 150 at the current version "2" is 150, and that two patterns have been newly added through an update from the version "1.5" to the version "2."

The pattern definition section 210 contains a pattern number 211, a pattern name 212, a pattern 213, and an addition flag 214.

The pattern number 211 indicates a number assigned to a pattern that the pattern definition file 150 defines.

The pattern name 212 indicates the name of a virus, in other words, the name of a data pattern that represents the characteristics of the virus.

Stored as the pattern 213 is the data pattern that expresses the characteristics of the virus. A file is scanned by checking data of the file against a data pattern stored as the pattern 213.

The addition flag 214 indicates whether or not a pattern has been newly added through an update of the pattern definition file 150 to the current version from the preceding version. The pattern 213 for which a value "ON" is stored as the addition flag 214 is a newly added pattern.

In the example of FIG. 2, "Virus-Y," "0012458FEA459569 . . . " and "OFF" are stored as the pattern name 212, the pattern 213 and the addition flag 214, respectively, in an entry that holds a value "149" as the pattern number 211. This means that a data pattern that represents the characteristics of a virus "Virus-Y" is "0012458FEA459569 . . . ," and that this pattern has been newly added through an update to the current version "2."

The pattern definition file 150 may be provided by a vendor of anti-virus software or the like. For instance, a software vendor or the like provides a newer version of the pattern definition file 150 as it becomes available. In this case, each time a new version is provided, the pattern definition file 150 is updated to the new version.

FIG. 3 is an explanatory diagram of a scan progress management table 300 according to the embodiment of this invention.

The scan progress management table 300 is used for managing the progress of a scan executed by the virus scan engine 105 for each file. The scan progress management table 300 may be stored, as a part of the virus scan engine 105 for example, in the memory 102 of the scan server 100.

The scan progress management table 300 contains in each of its entries an item number 301, a file name 302, a completion/incompletion label 303, write scan information 304, read scan information 308, and a resumption point 312.

Each entry (row) of the scan progress management table 300 corresponds to a file scanned by the virus scan engine 105.

The item number 301 indicates a number assigned to each entry.

The file name 302 indicates a name with which a scanned file is identified. The file name 302 may be a path such as "/dir-a/aaa.txt."

The completion/incompletion label 303 indicates whether or not a scan of the file has been completed. "Incomplete" stored as the completion/incompletion label 303 indicates that the scan has not been completed whereas "complete" indicates that the scan has been completed.

In this embodiment, scanning of one file may be accomplished in separate scans instead of a single scan. For instance, when 150 patterns are defined in the pattern definition file 150 as shown in FIG. 2, a scan that uses 75 of the 150 patterns may be executed in writing a file while executing a scan that uses the remaining 75 patterns in reading the file. Scanning of one file is "complete" only when the file has been scanned with the use of every pattern defined in the pattern definition file 150. When scanning of a file is completed, "complete" is stored as the completion/incompletion label 303 in an entry of the scan progress management table 300 that corresponds to this file. When, for example, the scan that is executed with the use of 75 of the 150 patterns in writing a file has been finished but the scan that uses the remaining 75 patterns has not been finished, "incomplete" is stored as the completion/incompletion label 303 in an entry of the scan progress management table 300 that corresponds to this file.

The write scan information 304 indicates information for managing the progress of a scan executed on a file upon writing of the file. Specifically, the write scan information 304 contains a finished date/time 305, a degree of progress 306, and an applied version 307. A scan executed on a file upon writing of the file refers to a scan executed in Step 603 of FIG. 6 which will be described later.

The finished date/time 305 indicates a date and time when the scanning upon file write is finished.

The degree of progress 306 indicates a number assigned to the last pattern that is used in the scanning upon file write. In other words, the degree of progress 306 indicates information for identifying a pattern that has already been used in scanning of the file. The number corresponds to the pattern number 211 in FIG. 2. For instance, "#75" is stored as the degree of progress 306 when the scan that uses 75 of the 150 patterns is finished upon writing of a file. This means that a scan using patterns that have "1" to "75" as the values of the pattern number 211 in FIG. 2 has been finished upon writing of the file.

The applied version 307 indicates a version (i.e., the value of the pattern definition file version 201) of the pattern definition file 150 that is used in the scanning upon file write.

The read scan information 308 indicates information for managing the progress of a scan executed on a file upon reading of the file. Specifically, the read scan information 308 contains a finished date/time 309, a degree of progress 310, and an applied version 311. A scan executed on a file upon reading of the file refers to a scan executed in Step 702 of FIG. 7 which will be described later.

In the case where a file corresponding to an entry of the scan progress management table 300 has never been read before, the scanning upon file read has not been performed on the file. Then the read scan information 308 of this entry does not need to hold a valid value.

The finished date/time 309 indicates a date and time when the scanning upon file read is finished.

The degree of progress 310 indicates a number assigned to the last pattern that is used in the scanning upon file read. The number corresponds to the pattern number 211 in FIG. 2. For instance, "#150" is stored as the degree of progress 310 in the case where the scan that uses 75 of the 150 patterns is finished upon writing of a file and then the scan that uses the remaining 75 patterns is finished upon reading of the file. This means that a scan using patterns that have "76" to '150" as the values of the pattern number 211 in FIG. 2 has been finished upon reading of the file.

The applied version 311 indicates a version (i.e., the value of the pattern definition file version 201) of the pattern definition file 150 that is used in the scanning upon file read.

When a file has been scanned with the use of some of defined patterns but not all of them, a number is stored as the resumption point 312 which is a number assigned to a pattern at the head of the remaining patterns. For instance, when the scan that uses 75 of the 150 patterns has been finished upon writing of a file but the file is yet to be read, scanning of the file using patterns that have "76" to "150" as the values of the pattern number 211 has not been finished. In this case, the number '76" assigned to the pattern at the head of the remaining patterns is stored as the resumption point 312.

FIG. 4 is an explanatory diagram of an access log 400 according to the embodiment of this invention.

The access log 400 is obtained by the file sharing program 125 each time the NAS server 120 receives an access request (write request or read request) from one of the clients 170. The access log 400 may be stored in, for example, the memory 122 as a part of the NAS access information obtainment processing module 130.

The access log 400 contains in each of its entries a date/time 401, an access source 402, an accessed file 403, and an access type 404.

The date/time 401 indicates a date and time when the NAS server 120 has received an access request.

The access source 402 indicates the identifier of one of the clients 170 that has sent the received access request.

The accessed file 403 indicates the identifier of a file specified by the received access request, i.e., a file to be accessed.

The access type 404 indicates the type of the requested access. Specifically, the access type 404 indicates whether the requested access is file read or file write. When the requested access is file write, the access type 404 may further contain information that indicates whether the requested write is for writing a new file or for updating an existing file.

FIG. 5 is an explanatory diagram of notified information 500 according to the embodiment of this invention.

The NAS server 120 creates access statistical information based on the obtained access log 400. The NAS server 120 sends the created statistical information to the scan server 100. The notified information 500 contains access statistical information sent in this manner.

For example, the notified information 500 may be stored in the memory 122 of the NAS server 120 as a part of the NAS access information obtainment processing module 130. The notified information 500 may also be stored in the memory 102 of the scan server 100 as a part of the notification information reception processing module 109.

The notified information 500 contains in each of its entries a date/time 501, a read ratio 502, a write ratio 503, and a transmission date/time 504.

The date/time 501 indicates a time window for reception of access requests on which statistical information stored as the read ratio 502 and the write ratio 503 is based.

The read ratio 502 and the write ratio 503 are statistical information created from the access log 400. Specifically, the read ratio 502 indicates the ratio of the read request count to the total count of access requests that the NAS server 120 has received within a time window indicated by the date/time 501. The write ratio 503 indicates the ratio of the write request count to the total count of access requests that the NAS server 120 has received within a time window indicated by the date/time 501.

The transmission date/time 504 indicates a date and time when statistical information stored as the read ratio 502 and the write ratio 503 is sent from the NAS server 120 to the scan server 100.

In the example of FIG. 5, "30%," "70%" and "2007/7/7 11:30:00" are stored as the read ratio 502, the write ratio 503 and the transmission date/time 504, respectively, in an entry that holds "2007/7/7 10:00~11:00" as the value of the date/time 501. This means that, of access requests that the NAS server 120 has received within an hour between 10:00 and 11:00 on Jul. 7, 2007, read requests constitute 30% whereas write requests constitute 70%, and that the statistical information has been sent from the NAS server 120 to the scan server 100 at 11:30:00 on Jul. 7, 2007.

Now, processing executed by the respective components of the computer system of this embodiment will be described with reference to flow charts.

Figure 6:
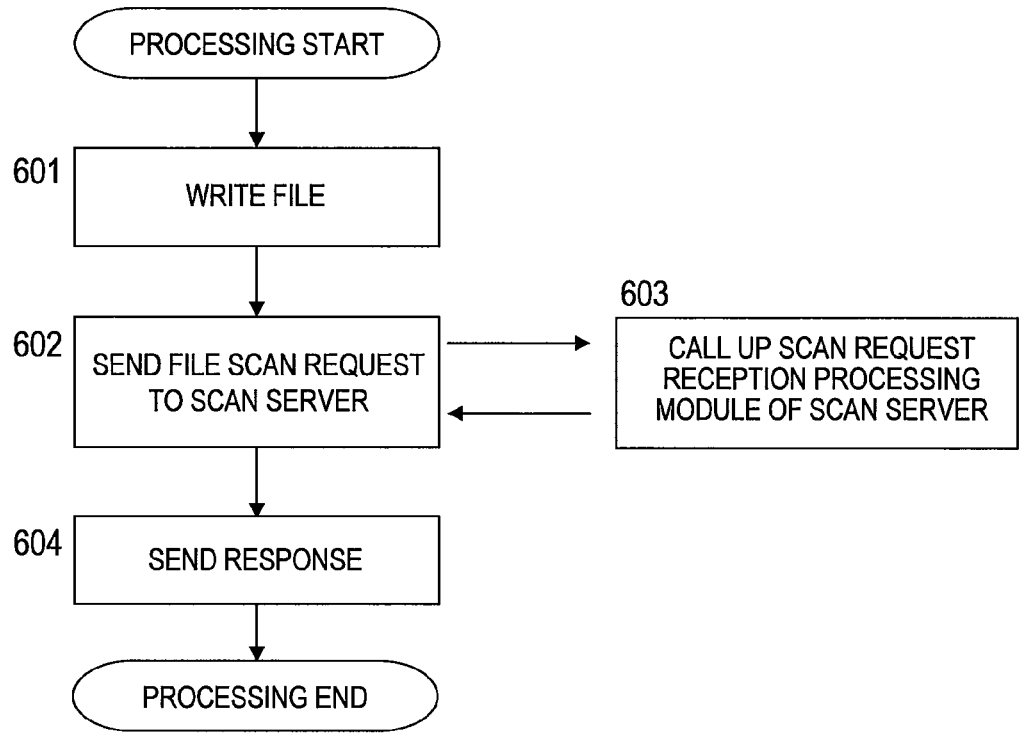
FIG. 6 is a flow chart showing processing that is executed through a write request reception processing module of an NAS server according to the embodiment of this invention.

FIG. 6 is a flow chart showing processing that is executed through the write request reception processing module 128 of the NAS server 120 according to the embodiment of this invention.

The processing shown in FIG. 6 is started when the NAS server 120 receives a write request from one of the clients 170. This processing is implemented by the CPU 123 by executing the write request reception processing module 128.

When the NAS server 120 receives a write request from one of the clients 170, the CPU 123 that executes the write request reception processing module 128 writes a file specified by the received write request (i.e., a file to be written as requested by the write request) in the file system (Step 601). To write the file in the file system, the kernel/file system 126 writes data contained in the specified file in one or more blocks of the LU 148 that is associated with the specified file.

The CPU 123 next sends a file scan request to the scan server 100 (Step 602). This scan request contains a file name with which the file written in Step 601 is identified.

Receiving the scan request, the scan server 100 calls up the scan request reception processing module 108 and executes the requested scan (Step 603). Details of the scan executed in Step 603 will be described later with reference to FIG. 9.

When the scan server 100 finishes the scan (specifically, when the NAS server 120 receives a notification shown in Step 910 of FIG. 9 which will be described later), the CPU 123 sends a response indicating the completion of the write processing to the client 170 that has sent the write request (Step 604).

The processing shown in FIG. 6 is thus completed.

Figure 7:
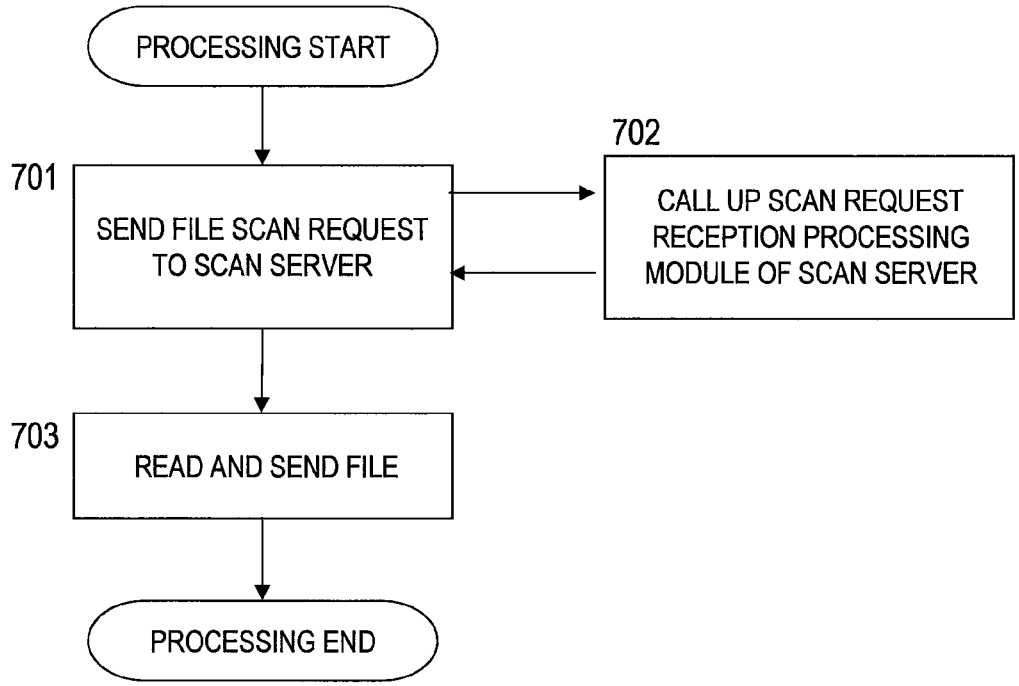
FIG. 7 is a flow chart showing processing that is executed through a read request reception processing module of the NAS server according to the embodiment of this invention.

FIG. 7 is a flow chart showing processing that is executed through the read request reception processing module 129 of the NAS server 120 according to the embodiment of this invention.

The processing shown in FIG. 7 is started when the NAS server 120 receives a read request from one of the clients 170. This processing is implemented by the CPU 123 by executing the read request reception processing module 129.

When the NAS server 120 receives a read request from one of the clients 170, the CPU 123 that executes the read request reception processing module 129 sends a file scan request to the scan server 100 (Step 701). This scan request contains a file name specified in the received read request.

Receiving the scan request, the scan server 100 calls up the scan request reception processing module 108 and executes the requested scan (Step 702). Details of the scan executed in Step 702 will be described later with reference to FIG. 9.

When the scan server 100 finishes the scan (specifically, when the NAS server 120 receives a notification shown in Step 910 of FIG. 9 which will be described later), the CPU 123 reads a file specified by the received read request out of its associated LU 148, and sends the read file to the client 170 (Step 703). To read the file out of the LU 148, the kernel/file system 126 reads data contained in the specified file out of one or more blocks of the LU 148 that is associated with the specified file.

The processing shown in FIG. 7 is thus completed.

Before moving on to the next topic, processing of updating files that are already stored in the LUs 148 will be described.

To update a stored file, the stored file needs to be read first. The client 170 therefore sends a read request specifying which file is to be updated to the NAS server 120. The NAS server 120 executes the processing shown in FIG. 7 to read the specified file, and sends the read file to the client 170. The client 170 updates the read file, and then sends a write request to write the updated file to the NAS server 120. The NAS server 120 executes the processing shown in FIG. 6 to write the requested file in its associated LU 148.

Thus, when a file stored in one of the LUs 148 is to be updated, the file is read before writing of the update without exception. In other words, after receiving a write request to write one file, the NAS server 120 always receives a read request to read the file before a write request directed to the file is received next.

Figure 8:
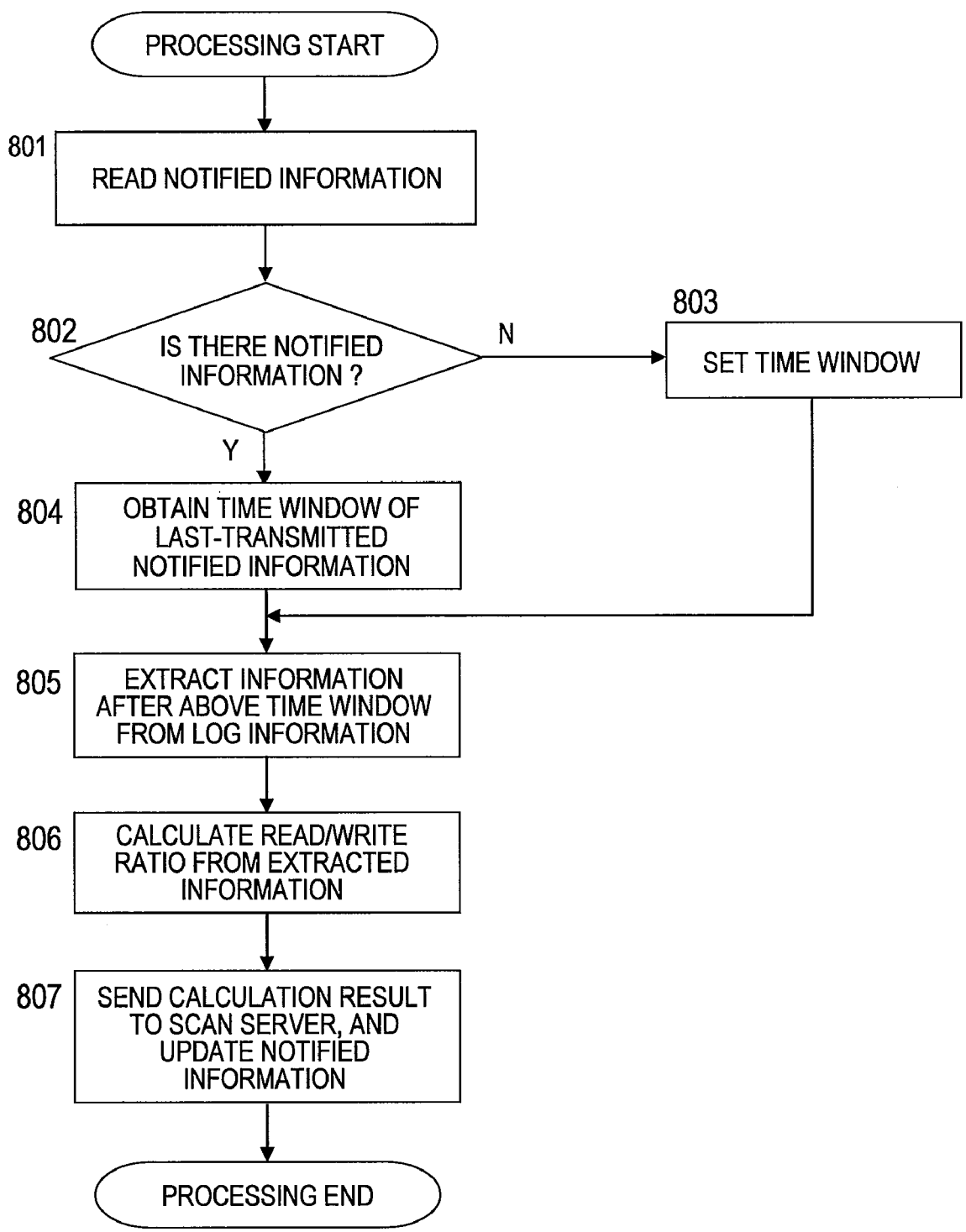
FIG. 8 is a flow chart showing processing that is executed through an NAS access information obtainment processing module of the NAS server according to the embodiment of this invention.

FIG. 8 is a flow chart showing processing that is executed through the NAS access information obtainment processing module 130 of the NAS server 120 according to the embodiment of this invention.

The processing shown in FIG. 8 is implemented by the CPU 123 by executing the NAS access information obtainment processing module 130 at predetermined timing.

As the processing is started, the CPU 123 reads the notified information 500 (Step 801).

The CPU 123 next judges whether or not there is the notified information 500 (Step 802).

When it is judged that there is no notified information 500, it means that the notified information 500 has not been created yet, and the reading in Step 801 has failed. Then the CPU 123 sets an arbitrary time window (Step 803). The time window set in Step 803 is for making entries to the access log 400 on which access statistical information is based. To give a specific example, a one-hour window between the current time and a time an hour prior to the current time is set in Step 803.

When it is judged that there is the notified information 500, the CPU 123 refers to the read notified information 500 to obtain a time window indicated by the date/time 501 of the last notified information that has been sent out (Step 804). For example, in the case where the notified information 500 shown in FIG. 5 is obtained and the last notified information has been sent out at 13:30:00 on Jul. 7, 2007, the CPU 123 obtains a time window "2007/7/7 12:00~13:00" which is indicated by the date/time 501 in the entry for the last notified information.

The CPU 123 next retrieves from the access log 400 access log information of a time later than the time window obtained in Step 804, or access log information of a time later than the time window set in Step 803 (Step 805). For example, any entry whose date/time 401 is later than "2007/7/7 13:00" is retrieved from the access log 400 in the case where a time window "2007/7/7 12:00~13:00" is obtained in Step 804.

From the information retrieved in Step 805, the CPU 123 calculates the read/write ratio (Step 806). Specifically, the CPU 123 calculates the ratio of the count of entries whose access type 404 is "read" to the total count of entries retrieved in Step 805, and the ratio of the count of entries whose access type 404 is "write" to the total count of entries retrieved in Step 805. The ratios calculated in Step 806 constitute access statistical information.

The CPU 123 sends the ratios calculated in Step 806 to the scan server 100 to update the notified information 500 with the calculated ratios (Step 807). Specifically, the CPU 123 adds a new entry to the notified information 500. In the new entry, the CPU 123 stores the time window obtained in Step 804, or the time window set in Step 803, as the date/time 501, the ratios calculated in Step 806 as the read ratio 502 and the write ratio 503, and the time at which the transmission to the scan server 100 is executed in Step 807 as the transmission date/time 504.

The processing of FIG. 8 is thus completed.

Figure 9:
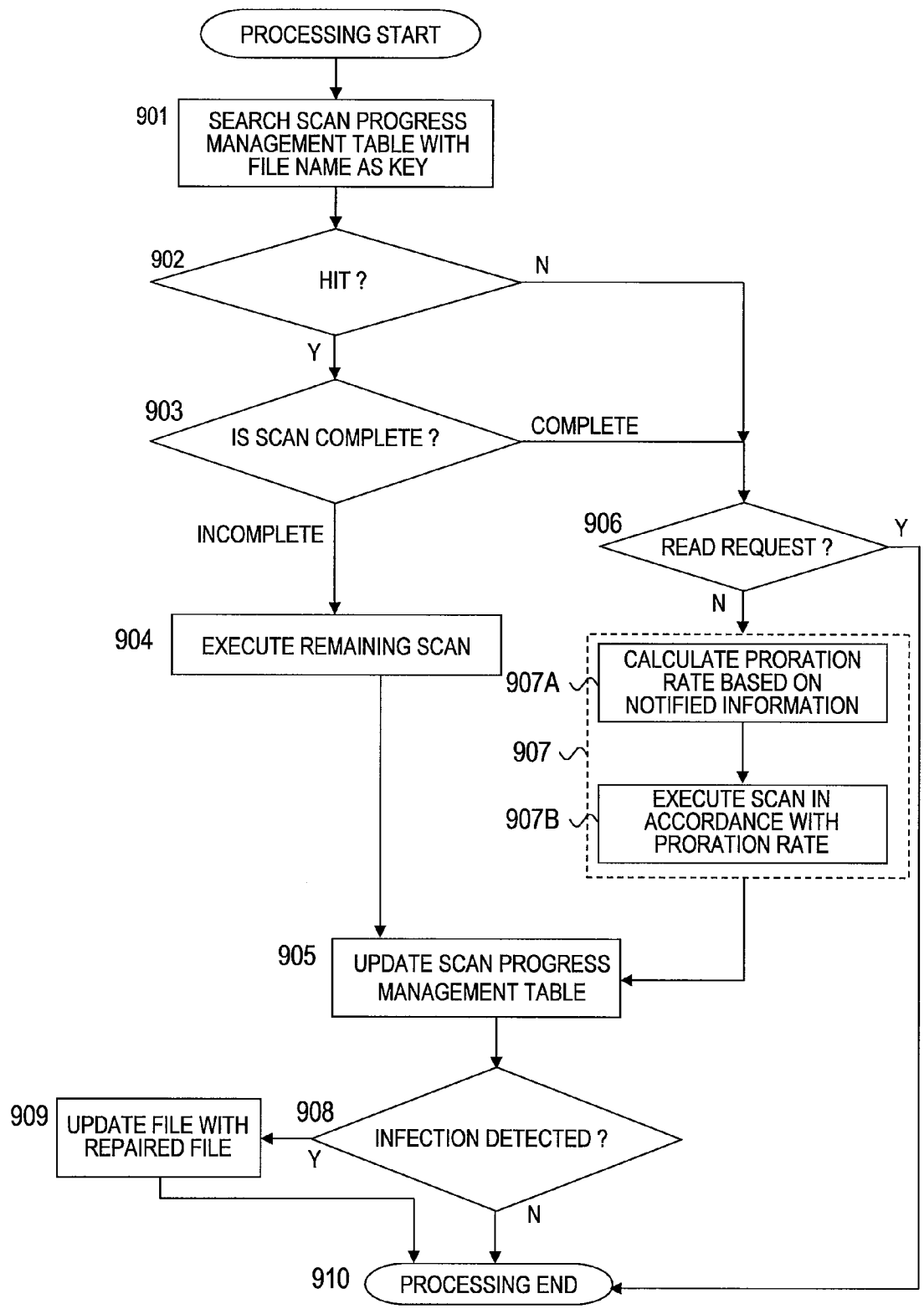
FIG. 9 is a flow chart showing processing that is executed through a scan request reception processing module of a scan server according to the embodiment of this invention.

FIG. 9 is a flow chart showing processing that is executed through the scan request reception processing module 108 of the scan server 100 according to the embodiment of this invention.

The processing shown in FIG. 9 is implemented by the CPU 103 of the scan server 100 by executing the scan request reception processing module 108 in Step 603 of FIG. 6 or Step 702 of FIG. 7.

The CPU 103 receives the scan request and searches the scan progress management table 300 using as a key a file name that is specified in the scan request (Step 901).

The CPU 103 next judges whether or not the scan progress management table 300 has an entry that holds the search key of Step 901 (Step 902). Specifically, the CPU 103 judges whether or not the scan progress management table 300 has an entry whose file name 302 matches the file name specified in the scan request.

When it is judged that no entry holds the search key (i.e., when it is judged as "No" in Step 902), it means that a file specified by the scan request has never been scanned. Then the CPU 103 proceeds to Step 906.

When it is judged that the scan progress management table 300 has an entry that holds the search key, it means that the specified file has been scanned in the past. Then the CPU 103 judges whether or not scanning of the specified file has been completed (Step 903). Specifically, the CPU 103 judges whether the value of the completion/incompletion label 303 is "complete" or "incomplete" in the entry found in the search of Step 901.

When it is judged in Step 903 that scanning of the specified file has been completed, the CPU 103 proceeds to Step 906.

In Step 906, the CPU 103 judges whether or not the received access request is a read request. Specifically, the CPU 103 judges that the received access request is not a read request in the case where the processing of FIG. 9 has been called up in Step 603 of FIG. 6. In the case where the processing of FIG. 9 has been called up in Step 702 of FIG. 7, the CPU 103 judges that the received access request is a read request.

In the case where it is judged in Step 902 that no entry holds the search key and then the received request is judged in Step 906 as a read request, it means that a non-existent file is specified by the read request issued. Then the CPU 103 ends the processing of FIG. 9 since executing a scan on a non-existent file is not possible. In the case where it is judged in Step 903 that the scanning has been completed and then the received request is judged in Step 906 as a read request, scanning of the specified file has been completed and the file does not need to be scanned further. Then the CPU 103 ends the processing of FIG. 9.

When it is judged in Step 906 that the received access request is not a read request (in other words, when the received access request is a write request), the CPU 103 executes Step 907. Specifically, in Step 907, the CPU 103 calculates a proration rate based on the notified information 500 (Step 907A), and executes a scan in accordance with the calculated proration rate (Step 907B). Details of the processing executed in Step 907 will be described with reference to FIGS. 10 and 11. After the process in Step 907 is finished, the CPU 103 proceeds to Step 905.

When it is judged in Step 903 that scanning of the specified file has not been completed, the CPU 103 executes the remaining scan (Step 904). Specifically, the CPU 103 reads the specified file out of the disk subsystem 140. The CPU 103 searches the scan progress management table 300 for an entry for the specified file and refers to the value of the resumption point 312 of this entry. Using a pattern indicated by the value of resumption point 312 and subsequent patterns, the CPU 103 executes a scan on the specified file. When the remaining scan is finished (in other words, when scanning of the specified file with the use of every defined pattern is completed), the CPU 103 proceeds to Step 905.

When the scan that is being executed is an asynchronous scan, which will be described later, there is a possibility that the remaining scan is already started at the time it is judged in Step 903 that scanning of the specified file has not been completed. In this case, the CPU 103 waits for the asynchronous scan to end. After the asynchronous scan is ended (in other words, when scanning of the specified file with the use of every defined pattern is completed), the CPU 103 proceeds to Step 905.

In Step 905, the CPU 103 updates the scan progress management table 300.

Specifically, when scanning of the specified file is completed in Step 904, the CPU 103 updates in Step 905 the value of the completion/incompletion label 303 to "complete" in an entry of the scan progress management table 300 for the specified file. The CPU 103 stores a date/time when Step 904 is finished and other relevant information as the read scan information 308 in this entry. The CPU 103 also deletes the value of the resumption point 312 of this entry if there is any value stored as the resumption point 312.

In the case where Step 905 is executed after the scan is executed in Step 907 in accordance with the proration rate, the CPU 103 stores a date and time when the scan of Step 907 is finished as the finished date/time 305, a number assigned to a pattern that is used in the last scan in Step 907 as the degree of progress 306, and the version of the employed pattern definition file 150 as the applied version 307. The CPU 103 also stores a value that follows the value of the degree of progress 306 as the resumption point 312.

The CPU 103 next judges whether or not a virus infection has been detected as a result of the scan executed in Step 904 or Step 907 (Step 908). If a virus infection is detected, the CPU 103 repairs the specified file and updates the specified file with the repaired file (Step 909).

When Step 909 is finished, or when no virus infection is detected in Step 908, the CPU 103 ends the processing of FIG. 9 (Step 910). At this point, the CPU 103 sends a notification to the NAS server 120 which notifies the finish of the scan based on the proration rate (Step 907) or completion of the scan that uses every pattern (Step 904).

Figure 10:
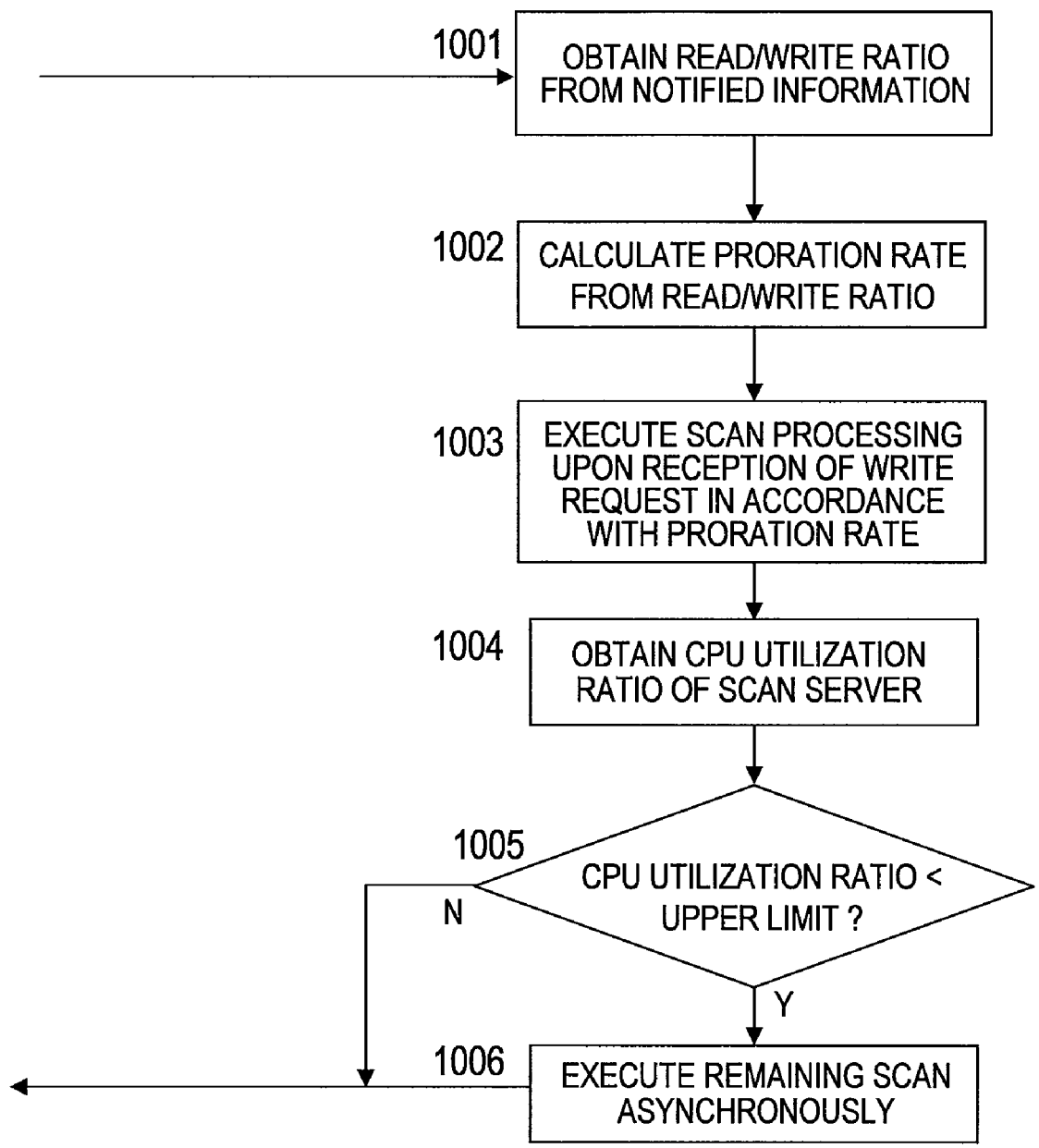
FIG. 10 is a flow chart showing a proration rate calculation and scanning based on the proration rate that are executed according to the embodiment of this invention.

FIG. 10 is a flow chart showing the proration rate calculation and scanning based on the proration rate that are executed according to the embodiment of this invention.

Specifically, FIG. 10 shows details of the processing that is executed by the CPU 103 in Step 907 of FIG. 9.

When it is judged in Step 906 of FIG. 9 that the received access is not a read request, the CPU 103 obtains the read ratio 502 and write ratio 503 of the specified file from the notified information 500 (Step 1001).

The CPU 103 calculates a proration rate based on the ratios obtained in Step 1001 (Step 1002). The proration rate is the ratio of a scan executed upon reception of a write request to a scan executed upon reception of a read request.

The scan executed upon reception of a write request is a scan that is executed after the NAS server 120 receives a write request and before the NAS server 120 sends a response to the write request, in other words, the scan executed in Step 603 of FIG. 6. The scan executed upon reception of a read request is a scan that is executed after the NAS server 120 receives a read request and before the NAS server 120 sends a response to the read request, in other words, the scan executed in Step 702 of FIG. 7.

The scan ratio refers to, for example, the ratio of the count of patterns that are used in the scan executed upon reception of a write request to the count of patterns that are used in the scan executed upon reception of a read request.

An example of a proration rate calculation method will now be described.

When the load on the CPU 103 of the scan server 100 is heavy, scanning of a file takes longer. As FIG. 6 shows as an example, a response to an access request is sent after the scan of Step 603 is finished, and prolonged scanning increases the likelihood of timeout. In order to avoid a timeout, it is therefore desirable to calculate a proration rate that keeps the load on the CPU 103 from exceeding a predetermined upper limit. The proration rate in this embodiment is accordingly calculated by subtracting each ratio (%) that is obtained in Step 1001 from 100(%).

Specifically, when the read ratio 502 and write ratio 503 obtained in Step 1001 are X % and (100−X) %, respectively, the ratio of the scan executed upon reception of a read request is (100−X) % and the ratio of the scan executed upon reception of a write request is X %.

For example, when the read ratio 502 and the write ratio 503 are 30% and 70%, respectively, as in the first entry of the notified information 500 shown in FIG. 5, the ratio of the scan executed upon reception of a read request is 70% and the ratio of the scan executed upon reception of a write request is 30%. In the case where the scan ratio refers to the ratio of the counts of patterns used in the scans, a scan that uses 30% of all the defined patterns is executed upon reception of a write request whereas a scan that uses the remaining 70% of the patterns is executed upon reception of a read request. When, for example, there are 150 patterns defined as shown in FIG. 2, a scan that uses 45 patterns of the 150 patterns is executed upon reception of a write request and a scan that uses the remaining 105 patterns is executed upon reception of a read request.

As a result, when, for example, data write is executed more often than data read, the ratio of the scan executed upon reception of a write request becomes smaller than the ratio of the scan executed upon reception of a read request. In the case where the scan ratio refers to the ratio of the counts of patterns used in the scans, it makes the count of patterns used in the scan upon reception of a write request smaller than the count of patterns used in the scan upon reception of a read request. In other words, it makes the count of patterns used in the scan upon reception of a write request smaller than half the total count of defined patterns.

When data read is executed more often than data write, on the other hand, the ratio of the scan executed upon reception of a write request becomes larger than the ratio of the scan executed upon reception of a read request.

In this way, executing scans upon reception of a write request and upon reception of a read request is prevented from increasing the load on the CPU 103, and a delay in execution of a scan due to the overload of the CPU 103 can be avoided.

The remaining scan which is not executed upon reception of a write request (in other words, the scan that uses patterns that are not employed in the scan upon reception of a write request) is executed upon reception of a read request. However, when the actual load on the CPU 103 (e.g., the CPU utilization ratio) is lower than the predetermined upper limit as will be described later, the remaining scan may be executed without waiting for the reception of a read request.

Next, the CPU 103 executes the scan upon reception of a write request on the specified file in accordance with the proration rate calculated in Step 1002 (Step 1003). Specifically, the CPU 103 reads the specified file out of the disk subsystem 140. The CPU 103 selects, from the patterns defined in the pattern definition file 150, as many patterns as determined by the scan ratio that is calculated in Step 1002 as the ratio of the scan executed upon reception of a write request, and executes a scan on the specified file using the selected patterns.

The CPU 103 then obtains the utilization ratio of the CPU 103 of the scan server 100 (Step 1004).

The CPU 103 judges whether or not the CPU utilization ratio obtained in Step 1004 is smaller than a predetermined upper limit (threshold) (Step 1005).

When the CPU utilization ratio is smaller than a predetermined upper limit, the CPU 103 executes the remaining scan of the specified file in an asynchronous manner (Step 1006). Specifically, the CPU 103 selects patterns that have not been used in Step 1003 from the patterns defined in the pattern definition file 150, and executes a scan on the specified file using the selected patterns.

The scan in Step 1006 is executed after a judgment is made in Step 1005, irrespective of whether a read request to read the specified file has been received or not. Like the scan in Step 1006, a scan that is not timed with the reception of an access request is referred to as asynchronous scan.

After Step 1006 is finished, the CPU 103 ends the processing of FIG. 10.

When it is judged in Step 1005 that the CPU utilization ratio is not smaller than a predetermined upper limit, the CPU 103 ends the processing of FIG. 10 without executing Step 1006.

The next step following the end of the processing of FIG. 10 is Step 905 of FIG. 9.

As shown in Step 904 of FIG. 9 and Step 1003 of FIG. 10, the scan server 100 in this embodiment receives a scan request from the NAS server 120 and reads a file specified by the scan request out of the disk subsystem 140. Alternatively, the file to be scanned may be contained in the scan request. The scan server 100 in this case does not need to read the file out of the disk subsystem 140.

In this embodiment, however, the scan server 100 and the NAS server 120 communicate with each other via an IP network such as the LAN 180 whereas the scan server 100 and the disk subsystem 140 communicate with each other through block access following the FC protocol or the like as shown in FIG. 1. Such a configuration makes reading of a file out of the disk subsystem 140 by the scan server 100 quicker than transmission of a file from the NAS server 120 to the scan server 100. It is therefore desirable in this embodiment to have the scan server 100 read a file out of the disk subsystem 140 in order to avoid a timeout.

Described next is an example of scanning that is based on a calculated proration rate.

Figure 11:
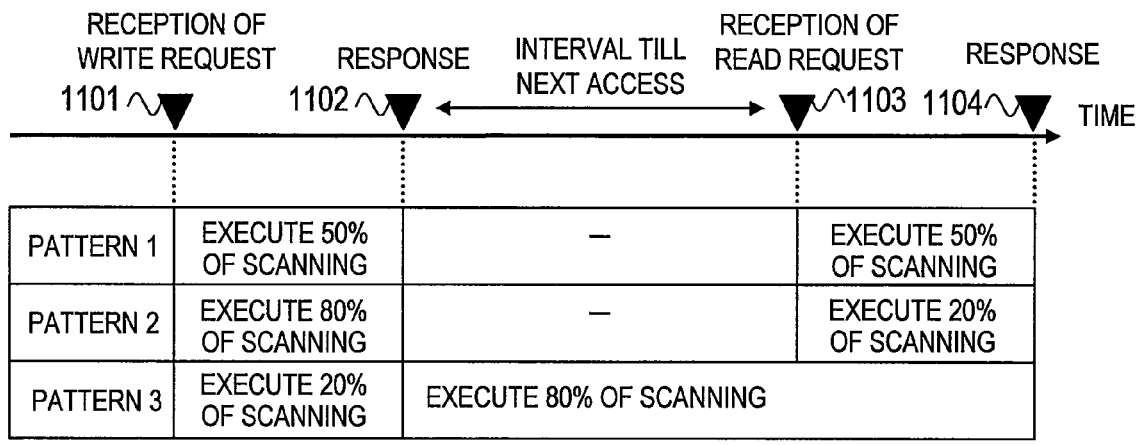
FIG. 11 is an explanatory diagram of an example of scanning that is executed based on a proration rate according to the embodiment of this invention.

FIG. 11 is an explanatory diagram of an example of scanning that is executed based on a proration rate according to the embodiment of this invention.

The examples shown in FIG. 11 are of scanning that is executed when one file is written in the NAS server 120 and scanning that is executed when the file is subsequently read. Specifically, FIG. 11 shows three examples from Pattern 1 to Pattern 3. Pattern 1 shows an example of scanning that is executed when the proration rate of the scan upon reception of a write request to the scan upon reception of a read request is 50%:50%. Similarly, Pattern 2 shows an example of scanning that is executed when the proration rate is 80%:20%. Pattern 3 shows an example of asynchronous scanning that is executed when the proration rate is 20%:80%.

In the example of Pattern 1, the scan server 100 starts scanning of a file after the NAS server 120 receives a write request (1101) to write the file. When 50% of the scanning is finished, the NAS server 120 sends a response (1102) to the write request. Thereafter, the NAS server 120 receives a read request (1103) to read the file, and then the scan server 100 starts the remaining scanning of the file. When the remaining 50% of the scanning is finished, the NAS server 120 sends a response (1104) to the read request.

In the example of Pattern 2, file scanning is executed the same way as in Pattern 1. The difference is that, in the example of Pattern 2, 80% of the scanning is executed between the reception of the write request (1101) and the transmission of the response (1102) whereas the remaining 20% of the scanning is executed between the reception of the read request (1103) and the transmission of the response (1104).

In the example of Pattern 3, 20% of the scanning is executed between the reception of the write request (1101) and the transmission of the response (1102). Thereafter, the remaining 80% of the scanning is started without waiting for the reception of the read request (1103). This corresponds to the case in which the CPU utilization ratio is judged as smaller than a predetermined upper limit in Step 1005 of FIG. 10. In the case where the remaining 80% of the scanning has not been finished at the time of the reception of the read request (1103), the response (1104) is sent after the scanning is completed as shown in Step 904 of FIG. 9.

As described above, FIG. 11 shows examples in which a part of file scanning is executed between a time at which the NAS server 120 receives a file write request and a time at which the NAS server 120 sends a response to the write request. However, this embodiment also allows the scan server 100 not to execute scanning of a file at all during a time period between the reception of a file write request and the transmission of a response to the write request.

For instance, when requests issued within one time window are all write requests and no read requests have been issued, the read ratio 502 and the write ratio 503 in this time window are 0% and 100%, respectively, in the notified information 500. The proration rate calculated in this case by the procedure shown in FIG. 10 is 0% for the scan executed upon reception of a write request.

In this case, full scanning of the file is executed after the NAS server 120 sends a response to the write request. The full scan may be executed in an asynchronous manner or may be executed at the time the NAS server 120 receives a read request to read the file, as shown in FIGS. 10 and 11.

According to FIG. 6 to FIG. 11 described above, the NAS server 120 receives a write request to write a file and sends a response to the write request when scanning of the file is partially (e.g., 50%) finished. The remainder of the scanning is executed when, for example, the NAS server 120 receives a read request to read the file. In the case where the client 170 that has sent the write request (the client 170A, for example) and the client 170 that has sent the read request (the client 170B, for example) are different clients, the processing time for scanning of one file is divided into response times to access requests made by a plurality of clients 170. Furthermore, the file is scanned in separate scans at a ratio appropriate to keep the load on the CPU 103 from increasing. Those prevent a timeout of an access request. Damage from a virus is also prevented since all the scans to be executed on a file are completed by the time the file is read, at the latest.

Figure 12:
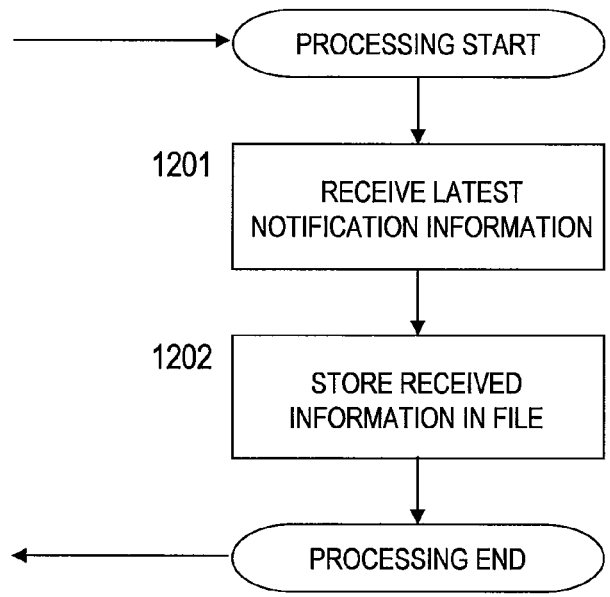
FIG. 12 is a flow chart showing processing that is executed through a notification information reception processing module of the scan server according to the embodiment of this invention.

FIG. 12 is a flow chart showing processing that is executed through the notification information reception processing module 109 of the scan server 100 according to the embodiment of this invention.

The processing shown in FIG. 12 is implemented by the CPU 103 by executing the notification information reception processing module 109 when the scan server 100 receives notification information from the NAS server 120.

First, the CPU 103 receives the latest notification information (Step 1201). The notification information received in Step 1201 is the one sent in Step 807 of FIG. 8 from the NAS server 120.

Next, the CPU 103 stores the received notification information in the notified information 500 (Step 1202).

The processing shown in FIG. 12 is thus completed.

Figure 13:
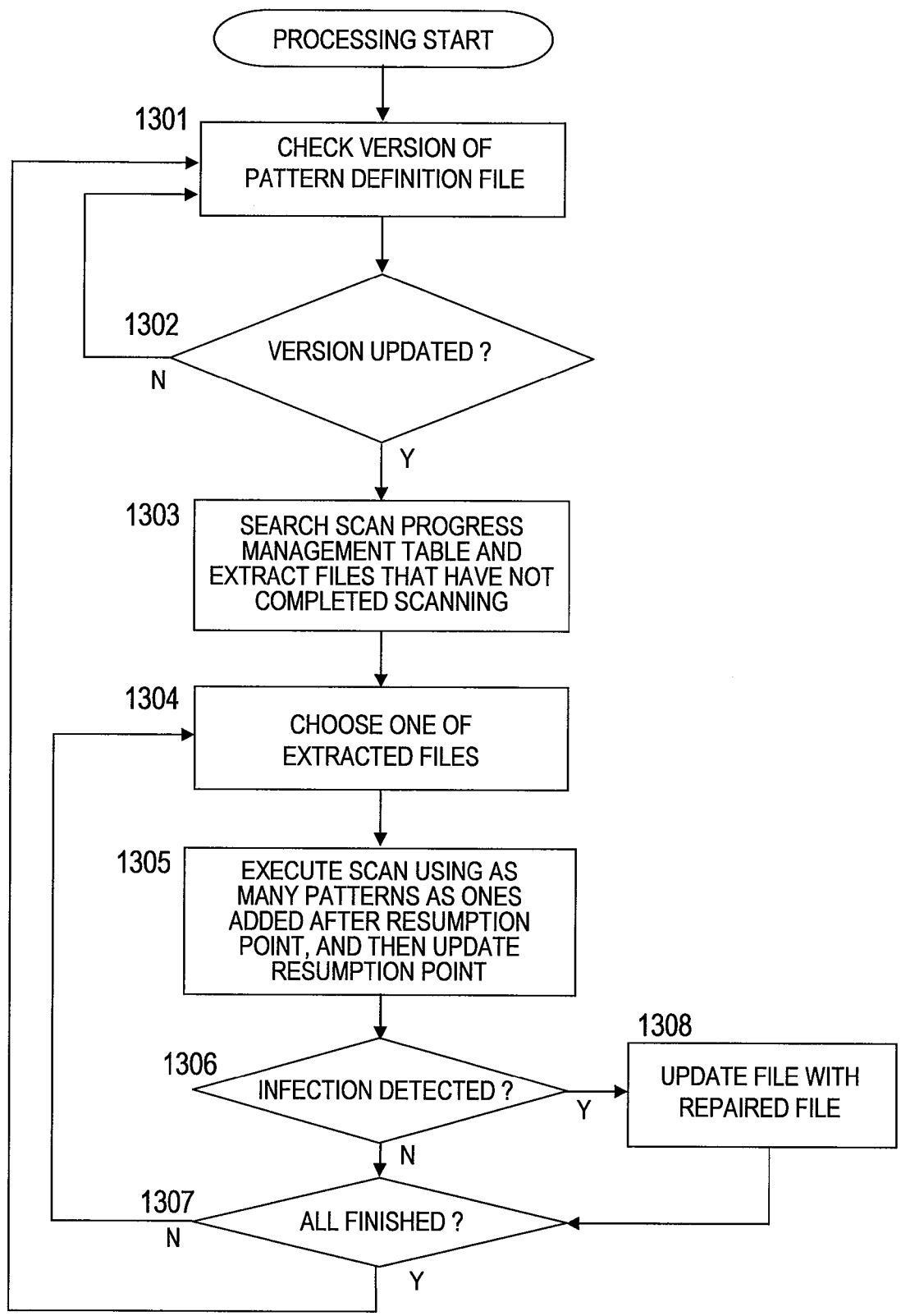
FIG. 13 is a flow chart showing processing that is executed through a pattern definition monitoring processing module of the scan server according to the embodiment of this invention.

FIG. 13 is a flow chart showing processing that is executed through the pattern definition monitoring processing module 110 of the scan server 100 according to the embodiment of this invention.

As has been described with reference to FIG. 6 to FIG. 11, an appropriate proration rate is calculated in this embodiment so that the load on the CPU 103 is kept light. However, in some cases, the pattern definition file 150 is updated after the proration rate is calculated. New patterns added through the update make the count of patterns that are used in the scan executed upon reception of a read request larger than a pattern count expected at the time the proration rate has been calculated. As a result, the load on the CPU 103 can become heavy enough to cause a timeout.

Shown in FIG. 13 is processing of preventing such an addition of patterns from increasing the load on the CPU 103 upon reception of a read request by executing an asynchronous scan using as many patterns as the added patterns.

The processing shown in FIG. 13 is implemented by the CPU 103 by executing the pattern definition monitoring processing module 110.

First, the CPU 103 checks the version of the pattern definition file 150 (Step 1301). Specifically, the CPU 103 obtains the value of the current pattern definition file version 201.

Next, the CPU 103 judges whether or not the pattern definition file 150 has undergone a version update (Step 1302). Specifically, the CPU 103 judges that the pattern definition file 150 has undergone a version update when the value of the pattern definition file version 201 obtained in Step 1301 as the current version differs from the value of the pattern definition file version 201 that has been obtained previously Step 1301 has been executed.

When it is judged that the version has not been updated, the CPU 103 returns to Step 1301.

When it is judged that the version has been updated, it means that new patterns have been added to the pattern definition file 150. Then the CPU 103 searches the scan progress management table 300 to extract files that have not completed being scanned (Step 1303). Specifically, the CPU 103 extracts entries that hold "incomplete" as the completion/incompletion label 303.

The CPU 103 then chooses one of the files extracted in Step 1303 (Step 1304).

The CPU 103 executes a scan on the file chosen in Step 1304, using as many patterns as the patterns that have been added through this update (Step 1305). Specifically, the CPU 103 selects, from a pattern indicated by the resumption point 312 in the entry of the scan progress management table 300 for the chosen file and subsequent patterns, as many patterns as the patterns that have been added through this update, and scans the chosen file using the selected patterns. The count of the patterns added through this update is stored as the added pattern count 204 in the pattern definition file 150.

In Step 1305, the CPU 103 also updates the resumption point 312 with a value that reflects the result of executing the scan.

For example, when "2" is stored as the added pattern count 204 in the pattern definition file 150 and "#76" is stored as the resumption point 312, the CPU 103 executes in Step 1305 a scan that uses two patterns, one having "76" as the pattern number 211 and the other having "77" as the pattern number 211, and then updates the value of the resumption point 312 to "#78."

The CPU 103 judges whether or not the scan of Step 1305 has detected a virus infection in the file chosen in Step 1304 (Step 1306).

When it is judged that the chosen file is infected with a virus, the CPU 103 repairs the chosen file and updates the chosen file with the repaired file (Step 1308).

When it is judged that the chosen file is not infected with a virus, or when Step 1308 is finished, the CPU 103 judges whether or not the scan of Step 1305 has been finished for every file extracted in Step 1303 (Step 1307).

When it is judged that the scan of Step 1305 has been finished for every extracted file, the process of the CPU 103 returns to Step 1301, where the next update of the pattern definition file 150 is detected.

When it is judged that at least one of the extracted files has not finished the scan of Step 1305, the process of the CPU 103 returns to Step 1304 to scan the remaining files. In Step 1304, one of the files that have not finished the scan of Step 1305 is chosen.

In this way, when new patterns are added as a result of an update of the pattern definition file 150, an asynchronous scan is executed with the use of as many patterns as the added patterns. A timeout due to an increase in load on the CPU 103 upon reception of a read request is thus avoided.

Described next is a modification example of this embodiment.

Information indicating the danger level of a virus is sometimes attached to a pattern provided by a vendor or the like. When this is the case, the scan server 100 may execute a scan that uses a pattern of a virus of high danger level before other scans. Processing based on the danger level of a virus will be described with reference to FIGS. 14 and 15.

Figure 14:
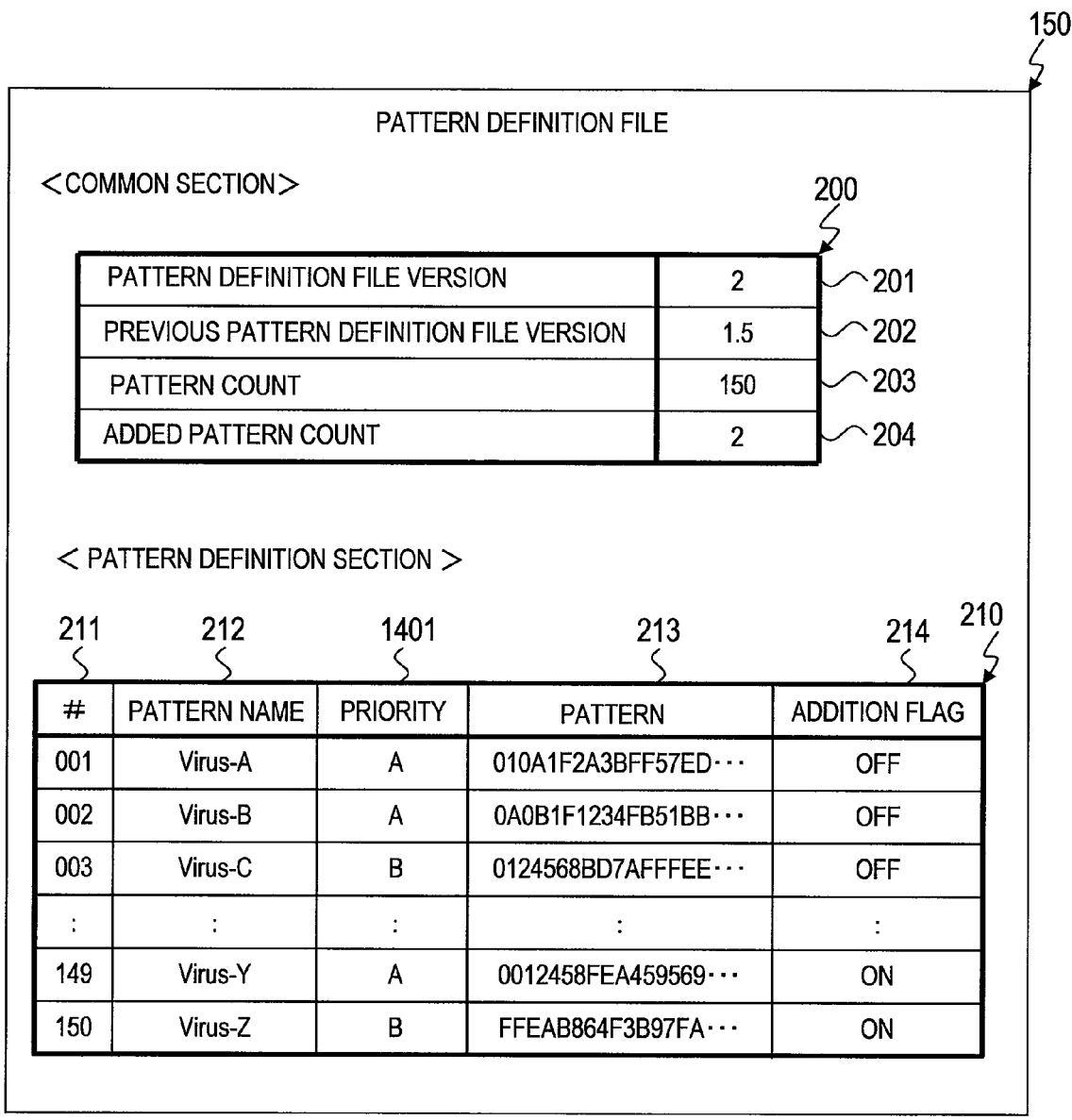
FIG. 14 is an explanatory diagram of the pattern definition file according to a modification example of the embodiment of this invention.

FIG. 14 is an explanatory diagram of the pattern definition file 150 according to the modification example of the embodiment of this invention.

The pattern definition file 150 shown in FIG. 14 contains the common section 200 and the pattern definition section 210 as the pattern definition file 150 shown in FIG. 2 does. The common section 200 shown in FIG. 14 is the same as the one shown in FIG. 2, and its description will be omitted here.

The pattern definition section 210 shown in FIG. 14 contains the pattern number 211, the pattern name 212, a priority level 1401, the pattern 213, and the addition flag 214. The pattern number 211, the pattern name 212, the pattern 213, and the addition flag 214 are the same as the ones shown in FIG. 2, and their descriptions will not be repeated.

The priority level 1401 indicates the priority level (i.e., importance) of a scan that uses the pattern in question. Some vendors or the like set a danger level to a virus based on, for example, the severity of damage caused by the activity of the virus. Desirably, a virus having a higher danger level is given a higher priority in scanning. A value that indicates the danger level of a virus is therefore preferably stored as the priority level 1401.

In the example of FIG. 14, "A" is stored as the priority level 1401 of patterns "Virus-A", "Virus-B", and "Virus-Y" whereas "B" is stored as the priority level 1401 of patterns "Virus-C" and "Virus-Z". "A" indicates a priority level higher than that of "B" in this example. This shows that viruses expressed by the patterns "Virus-A", "Virus-B", and "Virus-Y" are more dangerous than viruses expressed by other patterns, and that it is desirable to execute a scan that uses "Virus-A", "Virus-B", and "Virus-Y" before a scan that uses other patterns.

Patterns are desirably stored in descending order of priority in the pattern definition section 210. In the example of FIG. 14, pattern numbers "1" and "2" are assigned to the patterns "Virus-A" and "Virus-B", respectively, to which the priority level "A" is set, whereas a pattern number "3" is assigned to the pattern "Virus-C" to which the priority level "B" is set. When a smaller pattern number 211 is assigned to a pattern having a higher priority level 1401 in this manner, a scan using a pattern that has a higher priority level 1401 is automatically executed before other scans by scanning a file in the order of the pattern number 211.

The patterns "Virus-Y" and "Virus-Z" in the example of FIG. 14 are newly added patterns, and are added to the bottom of the pattern definition section 210. Of those two patterns, the pattern "Virus-Y" has a higher priority level and the pattern "Virus-Z" is placed after the "Virus-Y". Alternatively, when a new pattern is added, all the patterns included in the pattern definition section 210 may be sorted anew by order of priority.

Figure 15:
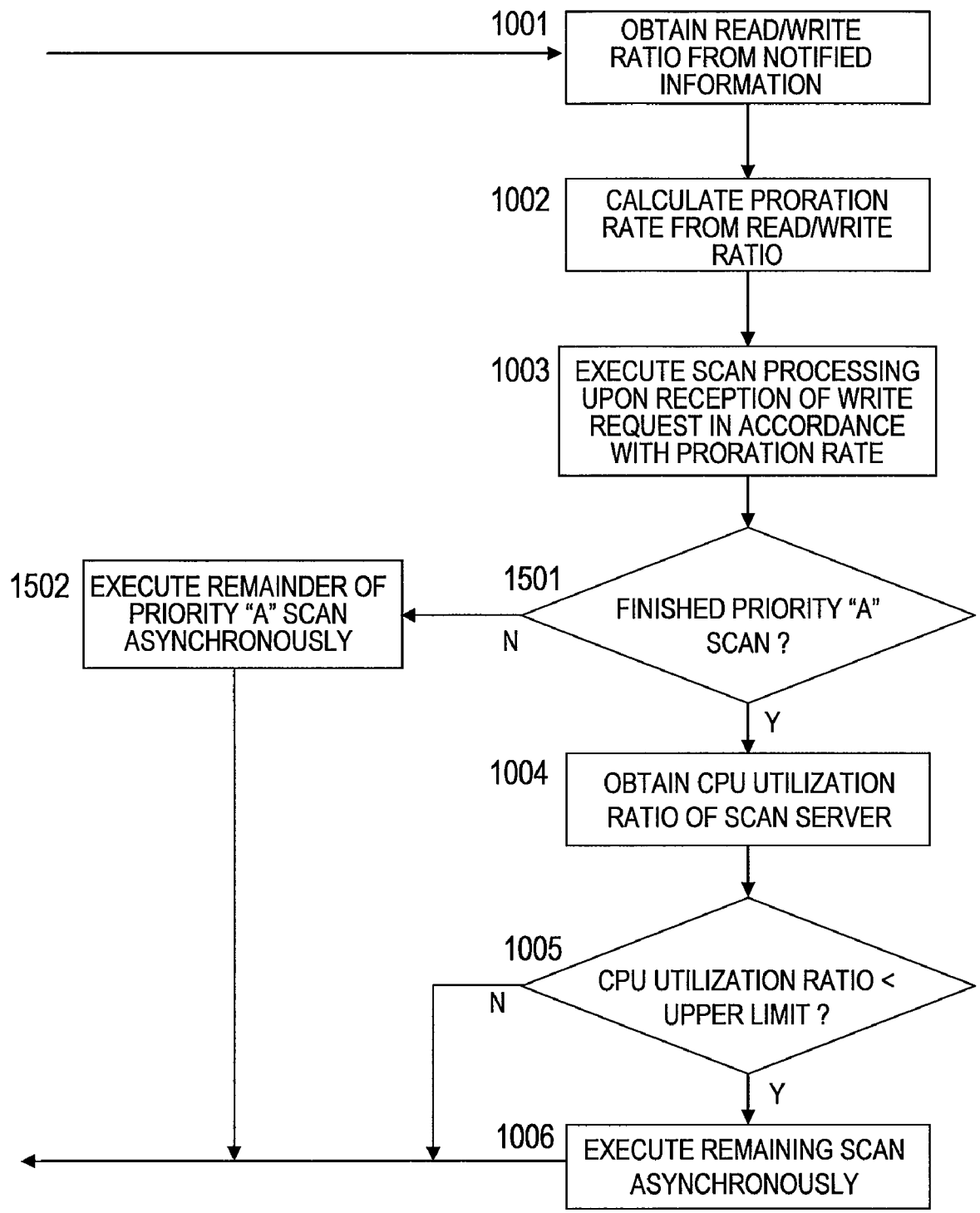
FIG. 15 is a flow chart showing proration rate calculation and scanning based on the proration rate that are executed according to the modification example of the embodiment of this invention.

FIG. 15 is a flow chart showing proration rate calculation and scanning based on the proration rate that are executed according to the modification example of the embodiment of this invention.

Step 1001 to Step 1003 and Step 1004 to Step 1006 of FIG. 15 are the same as the ones shown in FIG. 10, and their descriptions will be omitted here.

However, in Step 1003, the CPU 103 desirably executes a scan that uses a high-priority pattern before other scans. For example, in the case where a smaller pattern number 211 is assigned to a pattern that has a higher priority level 1401 in the pattern definition section 210 of the pattern definition file 150, the CPU 103 desirably executes scanning in the order of the pattern number 211. Alternatively, the CPU 103 may refer to the priority level 1401 to execute scanning in the order of priority.

In the step next to Step 1003 of FIG. 15, the CPU 103 judges whether or not scanning that uses patterns to which the priority level "A" is set has been finished (Step 1501).

When it is judged that scanning that uses patterns to which the priority level "A" is set has been finished, the CPU 103 proceeds to Step 1004.

When it is judged that scanning that uses patterns to which the priority level "A" is set has not been finished, the CPU 103 executes an asynchronous scan using the remaining patterns to which the priority level "A" is set (Step 1502). After Step 1502, the CPU 103 moves on to Step 905 of FIG. 9 without executing Step 1004 to Step 1006. As a result, a scan using the remaining patterns to which the priority level "A" is set is executed in an asynchronous manner after the disk subsystem 140 sends a response to a write request.

According to FIG. 14 and FIG. 15, a scan that uses a pattern to which a high priority level (i.e., high danger level) is set is processed before a scan that uses a pattern to which a lower priority level is set. Serious damage from a virus can thus be prevented more securely.

Processing that is executed to deal with a fluctuation in access ratio will be described next with reference to FIG. 16.

Figure 16:
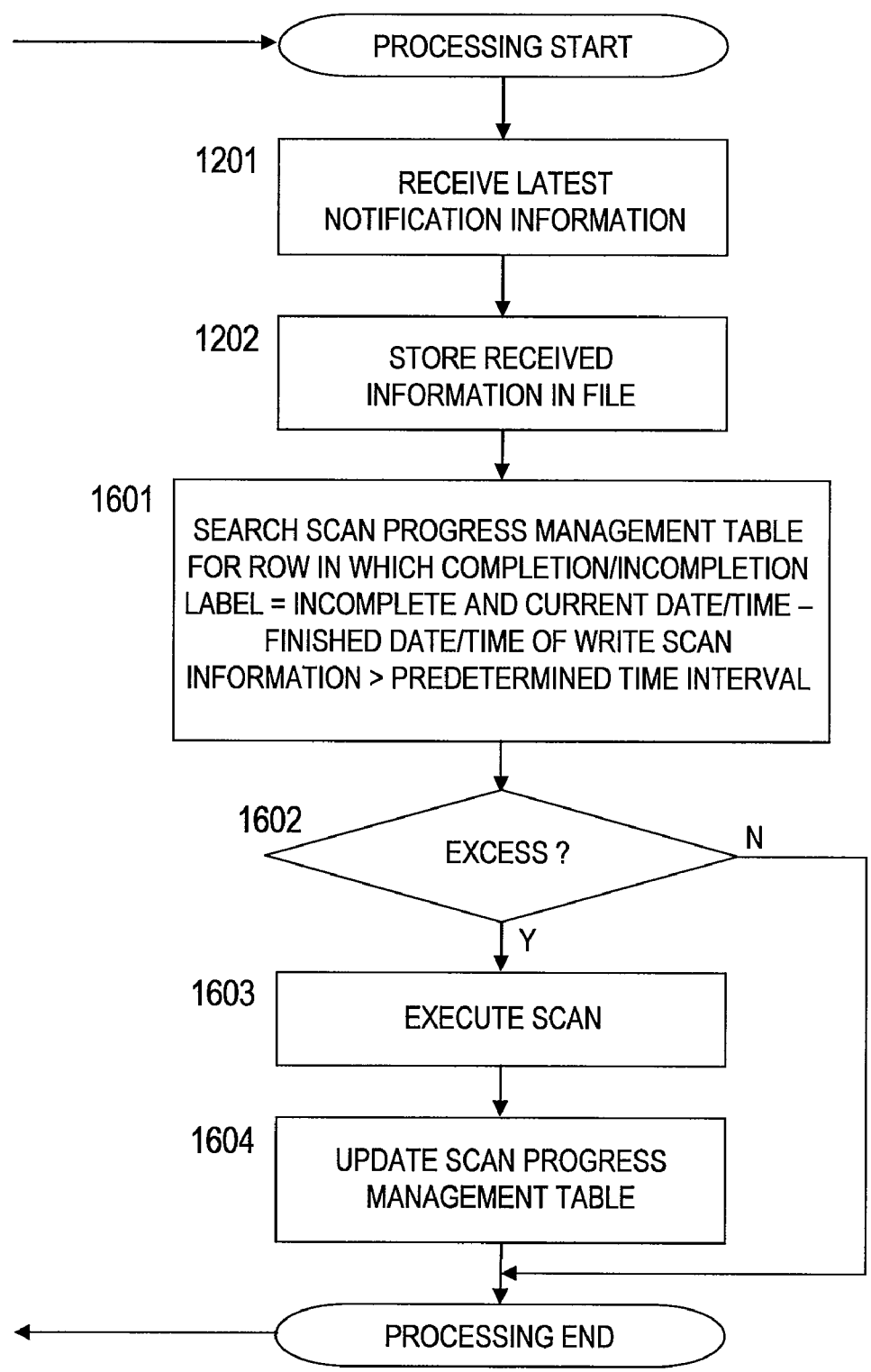
FIG. 16 is a flow chart showing processing of the notification information reception processing module of the scan server according to a modification example of the embodiment of this invention.

FIG. 16 is a flow chart showing processing of the notification information reception processing module 109 of the scan server 100 according to the modification example of the embodiment of this invention.

As has been described with reference to FIG. 6 to FIG. 11, an appropriate proration rate is calculated in this embodiment so that the load on the CPU 103 is kept light. However, in some cases, the access ratio (the read ratio 502 and the write ratio 503) on which the proration rate calculation is based changes after the proration rate is calculated.

For example, when the read ratio 502:the write ratio 503 is 30%:70% as in the first entry in FIG. 5, the proration rate is calculated such that 30% of scanning of a file is executed upon reception of a write request and 70% of the scanning is executed upon reception of a read request. If the read ratio 502:the write ratio 503 then changes to 70%:30% as in the second entry, 70% of the scanning has to be executed upon reception of a read request while the majority of access requests (70% of the total access request count) are read requests, and the load on the CPU 103 can become heavy enough to cause a timeout.

Shown in FIG. 16 is processing of preventing such a fluctuation in access ratio from increasing the load on the CPU 103 upon reception of a read request by executing an asynchronous scan for absorbing the fluctuation in access ratio.

The processing shown in FIG. 16 is implemented by the CPU 103 by executing the notification information reception processing module 109.

Step 1201 and Step 1202 of FIG. 16 are the same as the ones shown in FIG. 12, and their descriptions will be omitted here.

In the step next to Step 1202, the CPU 103 searches the scan progress management table 300 for an entry whose completion/incompletion label 303 is "incomplete" and in which the length of time between the finished date/time 305 and the current date/time exceeds a predetermined length (in other words, an entry in which a value obtained by subtracting the finished date/time 305 from the current date/time exceeds a predetermined value) (Step 1601). This is because the possibility of a change in access ratio increases as more time passes.

The CPU 103 then compares the count of remaining patterns in the entry obtained in Step 1601 against a remaining pattern count calculated from the current proration rate, to thereby judge whether or not the former pattern count is larger than the latter pattern count (Step 1602). The current proration rate is a proration rate calculated based on the latest notified information 500. "Excess" in Step 1602 of FIG. 16 means that the former pattern count is larger than the latter pattern count.

The CPU 103 judges in Step 1602 that the former pattern count is larger than the latter pattern count when the latest value of the read ratio 502 is greater than the value of the read ratio 502 at a time point that is indicated by the finished date/time 305 of the entry obtained in Step 1601 (in short, not the latest value of the read ratio 502).

When the former pattern count is larger than the latter pattern count, the actual load on the CPU 103 upon reception of a read request is heavier than originally expected, and there is a fear of a timeout. The CPU 103 in this case executes a scan that uses as many patterns as the difference between the latter pattern count and the former pattern count (Step 1603).

The CPU 103 then updates the scan progress management table 300 in a manner that reflects the scan executed in Step 1603 (Step 1604).

After Step 1604 is executed, the processing shown in FIG. 16 is ended.

When it is judged in Step 1602 that the former pattern count is not larger than the latter pattern count, the actual load on the CPU 103 upon reception of a read request is not heavier than originally expected. The CPU 103 in this case ends the processing of FIG. 16 without executing Step 1603 and Step 1604.

Described next with reference to FIG. 17 is how the accuracy of the proration rate is improved.

As has been described with reference to FIG. 10, the proration rate is calculated based on the access ratio, and a scan that uses as many patterns as determined by the proration rate is executed. The count of patterns determined by the proration rate is not always an integer, depending on the combination of the access ratio and the total pattern count.

For instance, when the total count of patterns defined in the pattern definition file 150 is 100 and the proration rate calculated based on the access ratio is 74.8%:25.2% (the scan upon reception of a write request:the scan upon reception of a read request), the scan executed upon reception of a write request has to use 74.8 patterns. The fraction may be dropped to execute a scan that uses 75 patterns. In a modification example described below, a scan in which the count of patterns used is a number that includes a fraction is accomplished by scanning a part of a file.

To employ the above example in which the total count of patterns defined in the pattern definition file 150 is 100 and the proration rate calculated based on the access ratio is 74.8%: 25.2%, the CPU 103 first executes a scan that uses the first pattern to the 74th pattern upon reception of a write request. The CPU 103 next checks data in the file to be scanned against the 75th pattern, starting from the head of the file, and stops checking when the check reaches a point that marks 80% of the total length of the file.

Thereafter, upon reception of a read request, the CPU 103 resumes the scanning that uses the 75th pattern, starting from the point that marks 80% of the total length of the file. After the scanning that uses the 75th pattern is finished, the CPU 103 subsequently executes a scan that uses the 76th to 100th patterns.

When the total count of defined patterns is given as N, the proration rate calculated based on the access ratio (the scan upon reception of a write request:the scan upon reception of a read request) is given as X %:(100−X) %, and the total length of data of a file to be scanned is given as S (bytes), the above specific example is generalized as follows:

$$N\text{write} = INT(X\% * N) \quad (1)$$

$$R\text{write} = S*(X\% * N - N\text{write}) \quad (2)$$

where Nwrite represents the count of patterns used in scanning of the full length of a file upon reception of a write request, Rwrite represents a range within the file that is scanned with the use of the last pattern upon reception of the write request, a symbol "*" represents multiplication, and a function "INT ( )" means rounding off of digits after the decimal point.

For example, when N=100, X=74.8(%), and S=512 (bytes) are substituted into Expressions (1) and (2), $$N\text{write} = INT(0.748*100) = 74$$

$$R\text{write} = 512*(0.748*100 - 74) = 409$$

are obtained. This shows that, as described above, a scan that uses the first pattern to the 74th pattern is executed and then the file is scanned with the use of the 75th pattern until the scan reaches 80% of the total length of the file (in other words, 409 bytes of the 512 bytes).

The calculation of Nwrite and Rwrite mentioned above is executed in Step 1002 of FIG. 10. Scanning based on the calculated Nwrite and Rwrite is executed in Step 1003 of FIG. 10. The progress of the scanning executed in the manner described above is managed with the use of a table shown in FIG. 17.

FIG. 17 is an explanatory diagram of the scan progress management table 300 according to the modification example of the embodiment of this invention.

Some items of the progress management table 300 of FIG. 17 are common to the progress management table 300 of FIG. 3, and their descriptions will be omitted here.

To simplify the explanation, the progress management table 300 shown in FIG. 17 is one for when the total count of patterns defined in the pattern definition file 150 is 100.

In FIG. 17, information indicating a point in file data is stored, in addition to a pattern number, as the degree of progress 306, the degree of progress 310, and the resumption point 312. For example, "#75" and "409/512" are stored as the degree of progress 306 in the first entry in FIG. 17. Those values indicate that the total length of a file "/dir-a/aaa.txt" for which this entry is created is 512 bytes, and that scanning of this file with the use of the 75th pattern has been finished from the head of the file to a 409-byte point.

As has been described, according to the embodiment of this invention, when the NAS server 120 receives a write request to write a file, the NAS server 120, the NAS server 120 sends a response to the write request when scanning of the file is partially (e.g., 50%) finished. The partial scanning may be scanning that uses only some of defined patterns, or may be scanning of a part of a scan target file.

The NAS server 120 sends the ratio of access requests received within one time window (in other words, the ratio of the count of write requests to the count of read requests) to the scan server 100. The scan server 100 calculates the scan execution ratio based on the sent ratio. The load on the CPU 103 is balanced appropriately by executing scanning in accordance with the calculated scan execution ratio.

Those improve the response speed of the CPU 103 and, as a result, a timeout of an access request is prevented.

The timeout is avoided by keeping the load on the CPU 103 from increasing also when patterns are newly added and when the access request ratio fluctuates.

In addition, damage from a virus is prevented since all the scans to be executed on a file are completed by the time the file is read, at the latest.

Damage from a virus can be reliably prevented by executing a scan that uses a pattern of a virus of high danger level before other scans.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
 a first computer;
 a second computer coupled to the first computer via a network; and
 a storage system coupled to the first computer and the second computer,
 wherein the first computer comprises a first interface coupled to the network, a first processor coupled to the first interface, and a first memory coupled to the first processor;
 wherein the second computer comprises a second interface coupled to the network, a second processor coupled to the second interface, and a second memory coupled to the second processor;
 wherein the storage system comprises a storage medium for providing a data storage area, and a controller coupled to the first computer and the second computer, for controlling data write and data read in the storage area;
 wherein one of the second computer and the storage system holds a plurality of virus patterns, each virus pattern corresponds to one of a plurality of danger levels;
 wherein the first computer is configured to:
 write, upon reception of a request to write data via the network from a client, the requested data in the storage system, and
 send a virus scan request of a written data to the second computer;
 wherein the second computer is configured to:
 read, upon reception of the virus scan request from the first computer, the written data out of the storage system, and
 partially execute a virus scan of a read data, by checking the read data against some of the plurality of patterns including at least pattern corresponded to a high danger level based on management information which includes information that indicates progress of the virus scan;

wherein the first computer is further configured to send, after the partial virus scan of the read data is finished, a response to the received write request;

wherein the first computer is further configured to:

send, upon reception of a request to read the written data via network from a client, a virus scan request of the requested written data to the second computer;

wherein the second computer is further configured to:

read, upon reception of the virus scan request from the first computer, the written data out of the storage system, and partially execute a virus scan of the read data by checking the read data against remaining patterns which are the plurality of patterns excluding the patterns that have already been used in previous checking, wherein the first computer is further configured to:

calculate a ratio of a count of write requests, and a ratio of a count of read requests, to a total count of access requests received via the network within a predetermined time period, and send the calculated ratios to the second computer, and wherein the second computer is further configured to:

partially execute, when the ratio of the write request count is greater than the ratio of the read request count, a virus scan of the read data by checking the read data against a number of patterns less than half the total count of the plurality of patterns, and partially execute, when the ratio of the write request count is smaller than the ratio of the read request count, a virus scan of the read data by checking the read data against a number of patterns more than half the total count of the plurality of patterns.

2. The computer system according to claim 1, wherein the first computer is further configured to send, upon reception via the network of a request to read the data written in the storage system, a virus scan request of the written data to the second computer, wherein the second computer is further configured to:

read, upon reception of the virus scan request from the first computer, the written data out of the storage system; and execute the remainder of the virus scan of the read data, and wherein the first computer is further configured to read, after the remainder of the virus scan is finished, the written data out of the storage system, and send the read data via the network.

3. The computer system according to claim 1, wherein the second computer is further configured to:

compare, upon reception of the calculated ratios, the received latest ratios against the ratios received previously; and check, when the ratio of the read request count that is indicated by the received latest ratios is larger than the ratio of the read request count that is indicated by the ratios received previously, the read data against at least one of the remaining patterns which are the plurality of patterns excluding the patterns that have already been used in checking.

4. The computer system according to claim 1, wherein one of the second computer and the storage system further holds information that indicates a danger level of each virus, wherein the plurality of patterns include a first pattern, which is a pattern of a first virus, and a second pattern, which is a pattern of a second virus, and wherein the second computer is further configured to:

judge the danger levels of the first virus and the second virus based on the information indicating the danger level of each virus; and check, when the danger level of the first virus is higher than that of the second virus, the read data against the first pattern before checking the read data against the second pattern.

5. The computer system according to claim 1, wherein the second computer is further configured to:

judge whether or not new patterns have been added; and check, when it is judged that the new patterns have been added, the read data against as many patterns as the added patterns, the patterns to be checked against being selected from the remaining patterns which are the plurality of patterns excluding the patterns that have already been used in checking.

6. The computer system according to claim 1, wherein one of the second computer and the storage system holds at least one virus pattern, and wherein the second computer is further configured to:

partially execute a virus scan of the read data by checking a part of the read data against the pattern;

hold management information including information that indicates progress of the virus scan; and execute the remainder of the virus scan of the read data by checking the rest of the read data, excluding the part that has finished being checked, against the pattern based on the management information.

7. The computer system according to claim 1, wherein the second computer is further configured to:

compare, after the partial virus scan of the read data is finished, a utilization ratio of the second processor against a predetermined threshold; and execute, when the utilization ratio of the second processor is lower than the predetermined threshold, the remainder of the virus scan of the read data.

8. The computer system according to claim 1, wherein the second computer is configured to:

update scan progress management information for managing, for each file, which virus patterns of the plurality of the virus patterns have been used in executing a virus scan of the file upon reception of a request to write the file, and partially execute, upon reception of a request to read a particular file, a virus scan of the file by checking the file against the remaining virus patterns which have not been used, with reference to the scan progress management information.

9. A method of controlling a computer system which has a first computer, a second computer coupled to the first computer via a network, and a storage system coupled to the first computer and the second computer, the first computer having a first interface coupled to the network, a first processor coupled to the first interface, and a first memory coupled to the first processor, the second computer having a second interface coupled to the network, a second processor coupled to the second interface, and a second memory coupled to the second processor, the storage system having a storage medium for providing a data storage area, and a controller coupled to the first computer and second computer, for controlling data write and data read in the storage area, wherein one of the second computer and the storage system holds a plurality of virus patterns, each virus pattern corresponds to one of a plurality of danger levels, the method comprising the steps of:

writing, by the first computer, upon reception of a request to write data via the network from a client, the requested data in the storage system;

sending, by the first computer, a virus scan request of a written data to the second computer;

reading, by the second computer, upon reception of the virus scan request from the first computer, the written data out of the storage system;

partially executing, by the second computer, a virus scan of a read data, by checking the read data against some of the plurality of patterns including at least pattern corresponded to a high danger level based on management information which includes information that indicates progress of the virus scan;

sending, by the first computer, after the partial virus scan of the read data is finished, a response to the received write request;

send, by the first computer, upon reception of a request to read the written data via network from a the client, a virus scan request of the requested written data to the second computer;

reading, by the second computer, upon reception of the virus scan request from the first computer, the written data out of the storage system;

partially executing, by the second computer, a virus scan of the read data by checking the read data against remaining patterns which are the plurality of patterns excluding the patterns that have already been used in previous checking;

calculating, by the first computer, a ratio of a count of write requests, and a ratio of a count of read requests, to a total count of access requests received via the network within a predetermined time period;

sending, by the first computer, the calculated ratios to the second computer;

partially executing, by the second computer, when the ratio of the write request count is greater than the ratio of the read request count, a virus scan of the read data by checking the read data against a number of patterns less than half the total count of the plurality of patterns; and partially executing, by the second computer, when the ratio of the write request count is smaller than the ratio of the read request count, a virus scan of the read data by checking the read data against a number of patterns more than half the total count of the plurality of patterns.

10. The method according to claim 9, further comprising the step of:

sending, by the first computer, upon reception of a request to read the data written in the storage system via the network, a virus scan request of the written data to the second computer, wherein the step of executing, by the second computer, the remainder of the virus scan of the read data comprises the steps of:

reading, by the second computer, the written data out of the storage system upon reception of the virus scan request from the first computer; and executing, by the second computer, the remainder of the virus scan of the read data, and wherein the method further comprises the step of reading, by the first computer, after the remainder of the virus scan is finished, the written data out of the storage system and sending the read data via the network.

11. The method according to claim 9, wherein one of the second computer and the storage system holds a plurality of virus patterns, wherein the step of partially executing the virus scan of the read data comprises checking, by the second computer, the read data against some of the plurality of patterns, wherein the second computer holds management information including information that indicates progress of the virus scan, and wherein the step of executing the remainder of the virus scan of the read data comprises checking, by the second computer, the read data against remaining patterns which are the plurality of patterns excluding the patterns that have already been used in checking based on the management information.

12. The method according to claim 11, further comprising the steps of:

comparing, by the second computer, upon reception of the calculated ratios, the received latest ratios against the ratios received previously; and checking, by the second computer, when the ratio of the read request count that is indicated by the received latest ratios is larger than the ratio of the read request count that is indicated by the ratios received previously, the read data against at least one of the remaining patterns which are the plurality of patterns excluding the patterns that have already been used in checking.

13. The method according to claim 11, wherein one of the second computer and the storage system further holds information that indicates a danger level of each virus, wherein the plurality of patterns include a first pattern, which is a pattern of a first virus, and a second pattern, which is a pattern of a second virus, and wherein the method further comprises the steps of:

judging, by the second computer, the danger levels of the first virus and the second virus based on the information indicating the danger level of each virus; and checking, by the second computer, when the danger level of the first virus is higher than that of the second virus, the read data against the first pattern before checking the read data against the second pattern.

14. The method according to claim 11, further comprising the steps of:

judging, by the second computer, whether or not new patterns have been added; and checking, by the second computer, when it is judged that new patterns have been added, the read data against as many patterns as the added patterns, the patterns to be checked against being selected from the remaining patterns which are the plurality of patterns excluding the patterns that have already been used in checking.

15. The method according to claim 9, wherein one of the second computer and the storage system holds at least one virus pattern, wherein the step of partially executing the virus scan of the read data comprises checking, by the second computer, a part of the read data against the pattern, wherein the second computer holds management information including information that indicates progress of the virus scan, and wherein the step of executing the remainder of the virus scan of the read data comprises checking, by the second computer, the rest of the read data, excluding the part that has finished being checked, against the pattern based on the management information.

16. The method according to claim 9, further comprising the steps of:

comparing, by the second computer, after the partial virus scan of the read data is finished, a utilization ratio of the second processor against a predetermined threshold; and executing, by the second computer, when the utilization ratio of the second processor is lower than the predetermined threshold, the remainder of the virus scan of the read data.

17. The method according to claim 9, further comprising the steps of:
  updating, by the second computer, scan progress management information for managing, for each file, which virus patterns of the plurality of the virus patterns have been used in executing a virus scan of the file upon reception of a request to write the file; and
  partially executing, by the second computer, upon reception of a request to read a particular file, a virus scan of the file by checking the file against the remaining virus patterns which have not been used, with reference to the scan progress management information.

18. A computer coupled to another computer and to a storage system via a network, comprising:
  an interface which is coupled to the network;
  a processor which is coupled to the interface; and
  a memory which is coupled to the processor,
  wherein one of the other computer and the storage system holds a plurality of virus patterns, each virus pattern corresponds to one of a plurality of danger levels;
  wherein the processor is configured to:
  write, upon reception of a request to write data via the network from a client, the requested data in the storage system, and
  send a virus scan request of a written data to the other computer;
  wherein the other computer is configured to:
  read, upon reception of the virus scan request from the computer, the written data out of the storage system, and
  partially execute a virus scan of a read data, by checking the read data against some of the plurality of patterns including at least pattern corresponded to a high danger level based on management information which includes information that indicates progress of the virus scan;
  wherein the processor is further configured to send, after the partial virus scan of the read data is finished, a response to the received write request;
  wherein the processor is further configured to:
  send, upon reception of a request to read the written data via network from a the client, a virus scan request of the requested written data to the second computer;
  wherein the other computer is further configured to:
  read, upon reception of the virus scan request from the computer, the written data out of the storage system, and
  partially execute a virus scan of the read data by checking the read data against remaining patterns which are the plurality of patterns excluding the patterns that have already been used in previous checking,
  wherein the processor calculates a ratio of a count of write requests, and a ratio of a count of read requests, to a total count of access requests received by the computer via the interface within a predetermined time period, and
  wherein the processor sends the calculated ratios to the other computer via the interface, and
  wherein the other computer is further configured to:
  partially execute, when the ratio of the write request count is greater than the ratio of the read request count, a virus scan of the read data by checking the read data against a number of patterns less than half the total count of the plurality of patterns, and
  partially execute, when the ratio of the write request count is smaller than the ratio of the read request count, a virus scan of the read data by checking the read data against a number of patterns more than half the total count of the plurality of patterns.

* * * * *